United States Patent
Liao et al.

(10) Patent No.: US 10,733,755 B2
(45) Date of Patent: Aug. 4, 2020

(54) LEARNING GEOMETRIC DIFFERENTIALS FOR MATCHING 3D MODELS TO OBJECTS IN A 2D IMAGE

(71) Applicant: QUALCOMM Incorporated, San Diego, CA (US)

(72) Inventors: Shuai Liao, Amsterdam (NL); Efstratios Gavves, Amsterdam (NL); Cornelis Gerardus Maria Snoek, Volendam (NL)

(73) Assignee: Qualcomm Incorporated, San Diego, CA (US)

( * ) Notice: Subject to any disclaimer, the term of this patent is extended or adjusted under 35 U.S.C. 154(b) by 104 days.

(21) Appl. No.: 16/039,133

(22) Filed: Jul. 18, 2018

(65) Prior Publication Data
US 2019/0026917 A1 Jan. 24, 2019

Related U.S. Application Data

(60) Provisional application No. 62/534,146, filed on Jul. 18, 2017.

(51) Int. Cl.
*G06K 9/00* (2006.01)
*G06T 7/73* (2017.01)
(Continued)

(52) U.S. Cl.
CPC ............ *G06T 7/73* (2017.01); *G06K 9/00208* (2013.01); *G06K 9/00624* (2013.01); *G06K 9/4628* (2013.01); *G06K 9/6215* (2013.01); *G06N 3/0454* (2013.01); *G06N 3/084* (2013.01); *G06N 5/046* (2013.01); *G06T 7/33* (2017.01);
(Continued)

(58) Field of Classification Search
None
See application file for complete search history.

(56) References Cited

U.S. PATENT DOCUMENTS

| | | | |
|---|---|---|---|
| 2011/0091073 A1* | 4/2011 | Iwasaki | G06T 7/292 382/103 |
| 2013/0107039 A1* | 5/2013 | Mehta | G06N 5/00 348/135 |

(Continued)

FOREIGN PATENT DOCUMENTS

| | | |
|---|---|---|
| CN | 106548521 A | 3/2017 |
| WO | 2016144674 A1 | 9/2016 |

OTHER PUBLICATIONS

Liao S., et al., "Searching and Matching Texture-free 3D Shapes in Images", ICMR'18 Proceedings of the 2018 ACM on International Conference on Multimedia Retrieval, Yokohama, Japan, Jun. 11-14, 2018, pp. 326-334.

*Primary Examiner* — Suhail Khan
(74) *Attorney, Agent, or Firm* — Seyfarth Shaw LLP

(57) ABSTRACT

A method aligns, with an artificial neural network, a three-dimensional (3D) model to an object in a 2D image. The method includes detecting, with an object detector, the object from the 2D image. The method also includes estimating a geodesic distance value between the object and multiple discretized poses of the 3D model. The method further includes selecting a discretized pose of the multiple discretized poses corresponding to a smallest geodesic distance value. The method still further includes propagating pose parameters of the selected discretized pose of the 3D model to the object.

24 Claims, 14 Drawing Sheets

(51) Int. Cl.
<table>
<tr><td>G06T 7/50</td><td>(2017.01)</td></tr>
<tr><td>G06N 5/04</td><td>(2006.01)</td></tr>
<tr><td>G06N 3/08</td><td>(2006.01)</td></tr>
<tr><td>G06T 7/60</td><td>(2017.01)</td></tr>
<tr><td>G06T 15/00</td><td>(2011.01)</td></tr>
<tr><td>G06N 3/04</td><td>(2006.01)</td></tr>
<tr><td>G06T 7/33</td><td>(2017.01)</td></tr>
<tr><td>G06K 9/62</td><td>(2006.01)</td></tr>
<tr><td>G06K 9/46</td><td>(2006.01)</td></tr>
<tr><td>G06T 7/194</td><td>(2017.01)</td></tr>
</table>

(52) U.S. Cl.
CPC .............. *G06T 7/50* (2017.01); *G06T 7/60* (2013.01); *G06T 15/005* (2013.01); *G06N 3/0445* (2013.01); *G06N 3/0472* (2013.01); *G06N 3/088* (2013.01); *G06T 7/194* (2017.01); *G06T 2207/20081* (2013.01)

(56) References Cited

U.S. PATENT DOCUMENTS

<table>
<tr><td>2016/0063661 A1*</td><td>3/2016</td><td>Doerr ................. H04N 19/124<br>382/100</td></tr>
<tr><td>2016/0098858 A1*</td><td>4/2016</td><td>Patkar ..................... G06T 7/73<br>345/420</td></tr>
<tr><td>2017/0039761 A1</td><td>2/2017</td><td>Zhang et al.</td></tr>
<tr><td>2017/0228940 A1</td><td>8/2017</td><td>Kutliroff</td></tr>
<tr><td>2017/0249776 A1</td><td>8/2017</td><td>Cao et al.</td></tr>
<tr><td>2019/0228571 A1*</td><td>7/2019</td><td>Atsmon ............... G06T 19/006</td></tr>
</table>

* cited by examiner

FIG. 3A  FIG. 3B

LEARNING GEOMETRIC DIFFERENTIALS FOR MATCHING 3D MODELS TO OBJECTS IN A 2D IMAGE

CROSS-REFERENCE TO RELATED APPLICATION

This application claims the benefit of U.S. Provisional Application No. 62/534,146, filed on Jul. 18, 2017, and titled "LEARNING GEOMETRIC DIFFERENTIALS FOR MATCHING 3D MODELS TO 2D OBJECTS," the disclosure of which is expressly incorporated by reference herein in its entirety.

BACKGROUND

Field

Certain aspects of the present disclosure generally relate to machine learning and, more particularly, to systems and methods for learning geometric differentials for propagating pose parameters of a three-dimensional (3D) model to a two-dimensional (2D) object.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using backpropagation.

Conventional computer vision systems attempt to recognize objects of interest by fitting 3D models onto a 2D view of an object in a 2D image, such as a red, green, blue (RGB) 2D image. The conventional process of fitting 3D models onto 2D images increases computational complexity, uses large 3D model libraries, and encodes local visual patterns and textures in real world images. To improve performance, some conventional vision systems use 2D appearance-based techniques, such as histogram of oriented gradients (HOG), deformable part models (DPM), recurrently connected neural networks (R-CNN), Fast R-CNN, Faster R-CNN, and single-shot detectors (SSDs).

Conventional computer vision systems may perform semantic labeling of an object (e.g., car, bicycle, etc.) and detect the object in a 2D image (e.g., surrounding the contours of the object with a bounding box). The object in the 2D image may be referred to as a 2D object. Semantic labeling and 2D object detection reduce the types of inferences that can be performed over a single 2D image. Conventional computer vision systems that detect 2D views of objects cannot perform 3D reasoning. 3D reasoning refers to, for example, determining a direction of travel of a vehicle; determining if a collision will occur; and determining whether an object should be moved to clear a path.

3D reasoning may be performed in conventional vision systems based on multi-view imaging, where the same object is photographed by a variety of viewpoints. That is, in conventional vision systems, multiple views of the same object from a variety of viewpoints are used to perform 3D reasoning. Multiple viewpoints may not be performed in real world scenarios where time and space are limited.

Conventional vision systems may also perform 3D reasoning by using 3D cuboids that surround the object of interest. Still, the use of 3D cuboids may limit an array of 3D inferences. For example, the conventional vision system may determine an object's direction (e.g., "which direction is the car traveling?"). 3D cuboids may also be used to determine whether two objects would collide (e.g., "will the drone rotors hit the wall?"). Still, because a cuboid approximates the object's shape and spatial extent, the accuracy of the collision determination is reduced.

Recently, conventional vision systems have matched 3D computer-aided design (CAD) models, obtained from model libraries, to 2D views of objects in 2D images. The conventional vision system may group the different 3D model instantiations into discrete classes, where each class represents a prototypical 3D model instantiation. In these conventional vision systems, an instantiation of a 3D model is defined by all of the rendering parameters. Furthermore, a new object in a 2D image is classified to one of these prototypical 3D model classes.

These conventional vision systems are limited by the number of models that can be used. The number of models is predetermined and specified during training. Thus, conventional vision systems cannot generalize to novel inputs. It would be desirable to improve conventional vision systems to perform 3D reasoning on novel inputs, such as inputs that were not provided during training.

SUMMARY

In one aspect of the present disclosure, a method for aligning a 3D model to an object in a 2D image is disclosed. The method includes detecting the object from the 2D image with an object detector. The method also includes estimating a geodesic distance value between the object and multiple discretized poses of the 3D model. The method further includes selecting a discretized pose of the multiple discretized poses corresponding to a smallest geodesic distance value. The method still further includes propagating pose parameters of the selected discretized pose of the 3D model to the object.

Another aspect of the present disclosure is directed to an apparatus including means for detecting the object from the 2D image. The apparatus also includes means for estimating a geodesic distance value between the object and multiple discretized poses of the 3D model. The apparatus further includes means for selecting a discretized pose of the multiple discretized poses corresponding to a smallest geodesic distance value. The apparatus still further includes means for propagating pose parameters of the selected discretized pose of the 3D model to the object.

In another aspect of the present disclosure, a non-transitory computer-readable medium with non-transitory program code recorded thereon is disclosed. The program code is for aligning a 3D model to an object in a 2D image. The program code is executed by a processor and includes program code to detect the object from the 2D image with an object detector. The program code also includes program code to estimate a geodesic distance value between the object and multiple discretized poses of the 3D model. The program code further includes program code to select a discretized pose of the multiple discretized poses corresponding to a smallest geodesic distance value. The program code still further includes program code to propagate pose parameters of the selected discretized pose of the 3D model to the object.

Another aspect of the present disclosure is directed to an apparatus for aligning a 3D model to an object in a 2D image. The apparatus includes a memory and one or more processors coupled to the memory. The processor(s) is configured to detect the object from the 2D image with an object detector. The processor(s) is also configured to estimate a geodesic distance value between the object and multiple discretized poses of the 3D model. The processor(s) is further configured to select a discretized pose of the multiple discretized poses corresponding to a smallest geodesic distance value. The processor(s) is still further configured to propagate pose parameters of the selected discretized pose of the 3D model to the object.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 3A, 3B, and 3C are diagrams illustrating a neural network in accordance with aspects of the present disclosure.

DETAILED DESCRIPTION

Figure 1:
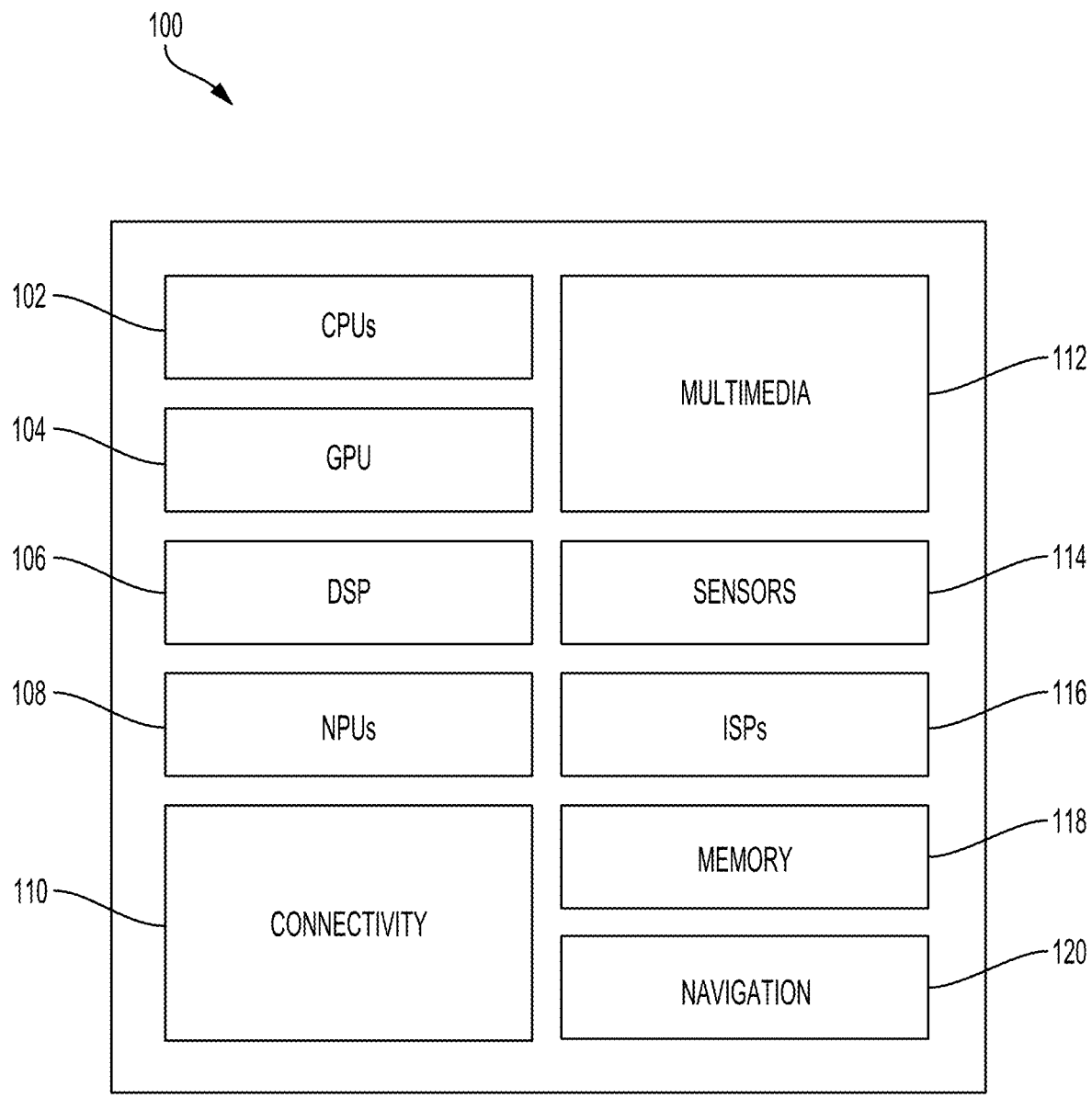
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Conventional vision systems approach matching 3D models to 2D objects as a classification learning problem. That is, conventional vision systems are trained to match a 3D model to an object detected in a 2D image. If an object (e.g., class) is not provided in a training set, the conventional vision system may fail to match the 3D model to the object in real world scenarios.

That is, for 3D-to-2D object alignment, conventional vision systems use exemplar classifiers that are trained to model an absolute relation between particular computer-aided design (CAD) views (e.g., views of a 3D model) and particular red, green, blue (RGB) appearances. The conventional vision systems model the relation via texture-sensitive features, such as a histogram of oriented gradients and other variants. For example, some conventional vision systems propose a linear discriminant analysis (LDA) based classifier trained on features of textured 3D models of chairs to detect the 3D model and the pose that best matches real chair images. In conventional vision systems, classifiers are trained for specific models and specific poses. That is, conventional vision systems learn a relation between 3D models and poses. The conventional vision systems also learn a relation between 3D models and RGB appearances. Therefore, conventional vision systems cannot accommodate new 3D models or poses without retraining.

According to aspects of the present disclosure, an object detection model (e.g., object alignment model) is not trained to recognize specific class definitions. Rather, the model is trained to recognize the relative distance of most similar CAD prototype models to objects in a 2D image. As a result, during testing (e.g., when an object detection system is online), new 3D model instantiations can be added, on demand.

In one configuration, during training, a real image is sampled to obtain (e.g., detect) an object of interest. For the training, a ground-truth 3D model instantiation is available for the real image. The training objective is to teach the object detection system how to estimate the geodesic distance (e.g., geodesic distance value) between rotation matrices. To improve training, positive and negative samples (e.g., poses) are provided. Positive samples refer to samples (e.g., estimates) where the geodesic distance between the object and the rendering is less than a threshold. Negative samples refer to samples where the geodesic distance between the object and rendering is greater than a threshold. The training proceeds with the positive and negative samples, using a stochastic gradient descent (SGD) for backpropagation.

After training, during real world implementation (e.g., testing), an object is detected from an image (e.g., 2D RGB image) by an object detector. Upon detecting the object, the object detection system traverses possible rendering instantiations. That is, a geometric differential module computes the geodesic distance between each possible rendering instantiation (e.g., 3D CAD model) and the object (e.g., RGB object) obtained from the image. The geodesic distance is a distance between rotation matrices of the 3D CAD model and the object. In another example, the geometric differential module computes an anchor flow distance between anchor points in the 3D CAD model and the object.

A geometric differential module traverses multiple rendered images to select the rendered image corresponding to a smallest geodesic distance. The rendered image with the smallest geodesic distance may be referred to as the most similar matching rendering instantiation or the best fit. After selecting the best fit rendering, the 3D model parameters (e.g., pose parameters) from the selected rendering may be transferred to the object. The transferred parameters may be used for 3D reasoning.

FIG. 1 illustrates an example implementation of the aforementioned 3D rendering to object alignment model using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fifth generation connectivity (5G), fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or a navigation module 120, which may include a global positioning system.

The SOC 100 may be based on an ARM instruction set. In an aspect of the present disclosure, the instructions loaded into the general-purpose processor 102 may comprise code to detect an object from the 2D image. The object may be detected with an object detector. The instructions loaded into the general-purpose processor 102 may also comprise code to estimate a geodesic distance value between the object and multiple discretized poses of the 3D model. The instructions loaded into the general-purpose processor 102 may further comprise code to select a discretized pose of the multiple discretized poses corresponding to a smallest geodesic distance value. The instructions loaded into the general-purpose processor 102 may still further comprise code to propagate pose parameters of the selected discretized pose of the 3D model to the object.

Figure 2:
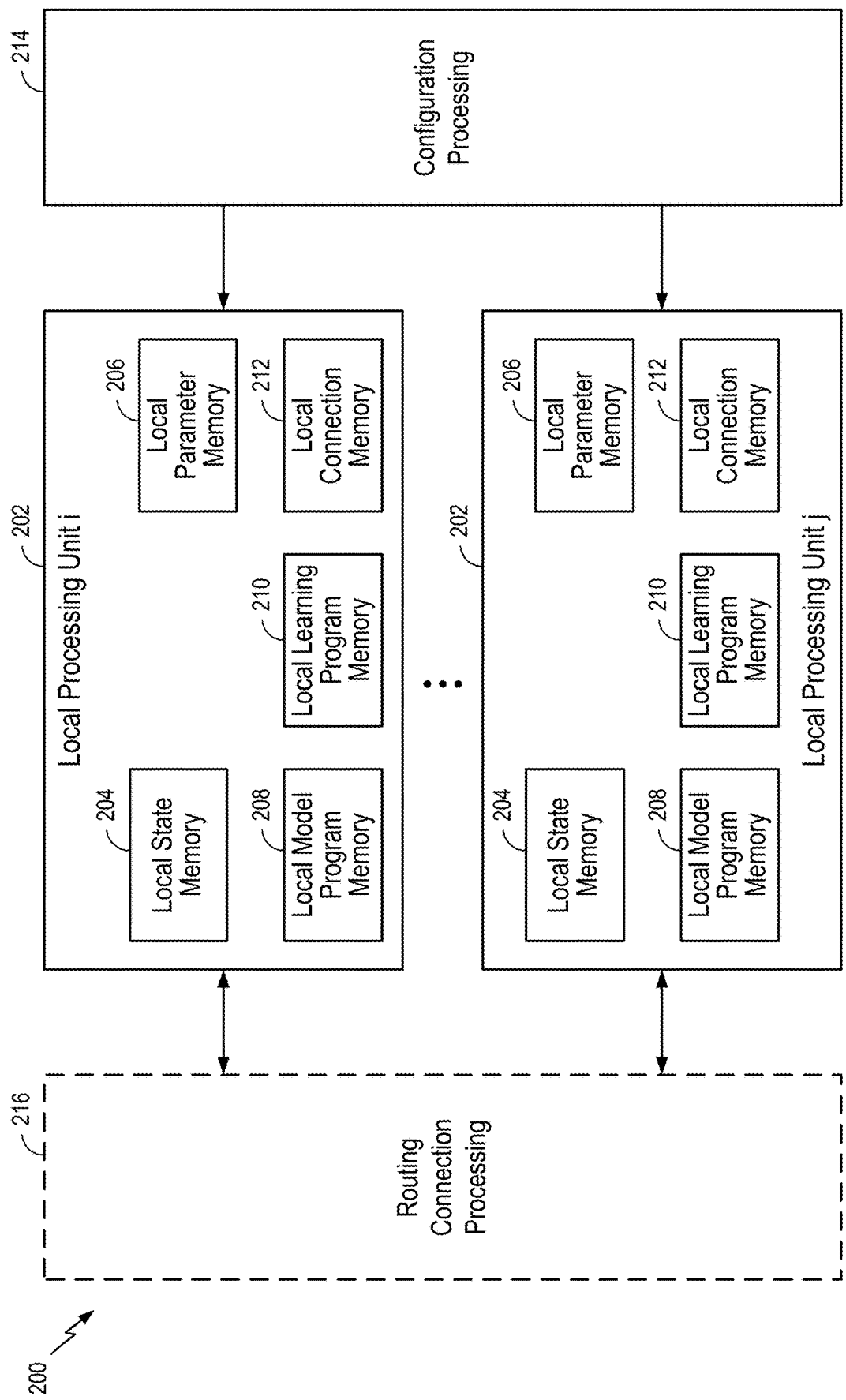
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 3A illustrates an example of a fully connected neural network 302. In a fully connected neural network 302, a neuron in a first layer may communicate its output to every neuron in a second layer, so that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figure 3C:
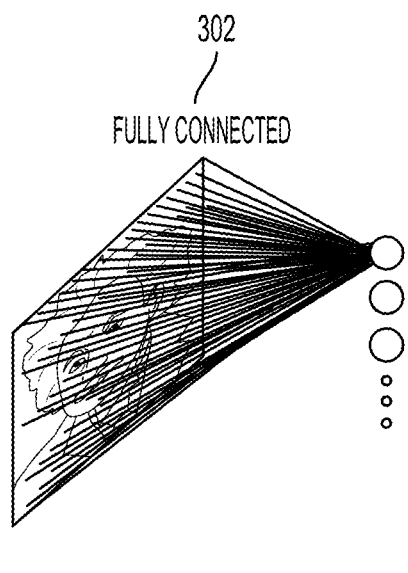
Figure 3C:
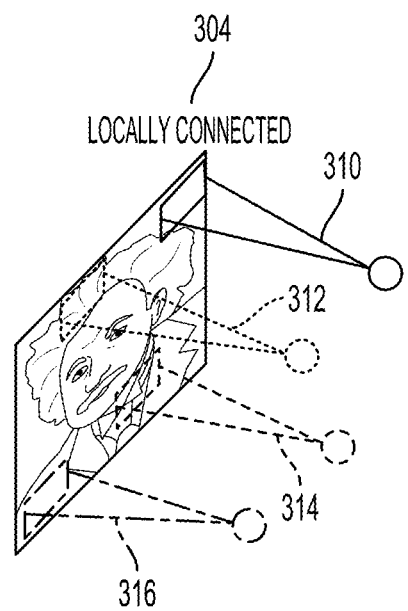
Figure 3C:
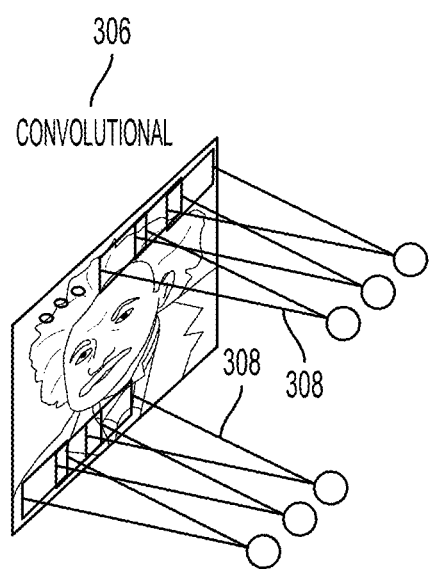

One example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., 308). Convolutional neural networks may be well suited to problems in which the spatial location of inputs is meaningful.

Figure 3D:
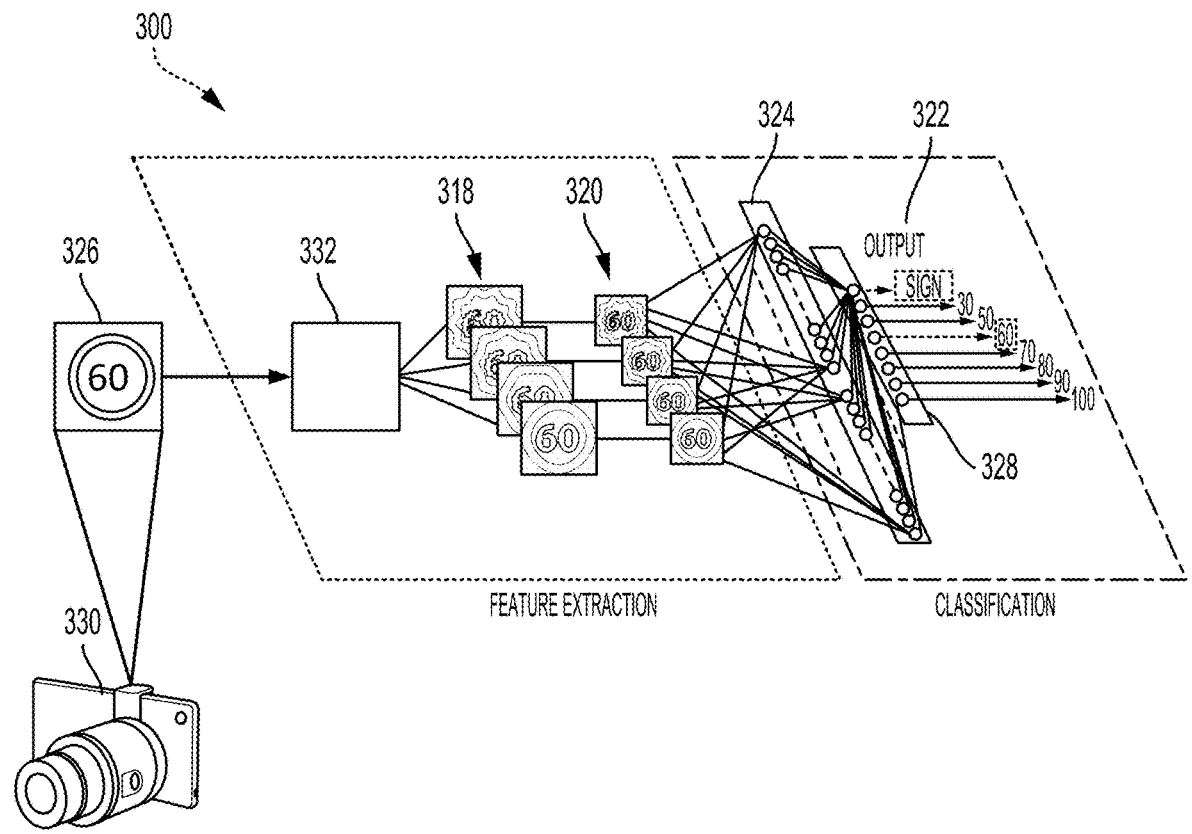
FIGS. 3D and 3E are diagrams illustrating an exemplary deep convolutional network (DCN) in accordance with aspects of the present disclosure.

One type of convolutional neural network is a deep convolutional network (DCN). FIG. 3D illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. Of course, the DCN 300 may be trained for other tasks, such as identifying lane markings or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the other outputs 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning function may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as back propagation as it involves a backward pass through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning (e.g., training), the DCN 300 may be presented with new images 326 and a forward pass through the network may yield an new output 322 that may be considered an inference or a prediction of the DCN 300.

Deep belief networks (DBNs) are probabilistic models comprising multiple layers of hidden nodes. DBNs may be used to extract a hierarchical representation of training datasets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional neural networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map, with each element of the feature map receiving an input from a range of neurons in the previous layer and from each of the multiple channels. The values in the feature map may be further processed with a non-linearity activation function, such as a rectified linear unit (ReLU). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. A rectified linear unit may reduce a training issue known as vanishing gradients. New training techniques may reduce over-fitting and thus enable larger models to achieve better generalization. Encapsulation techniques may abstract data in a given receptive field and further boost overall performance.

Figure 3E:
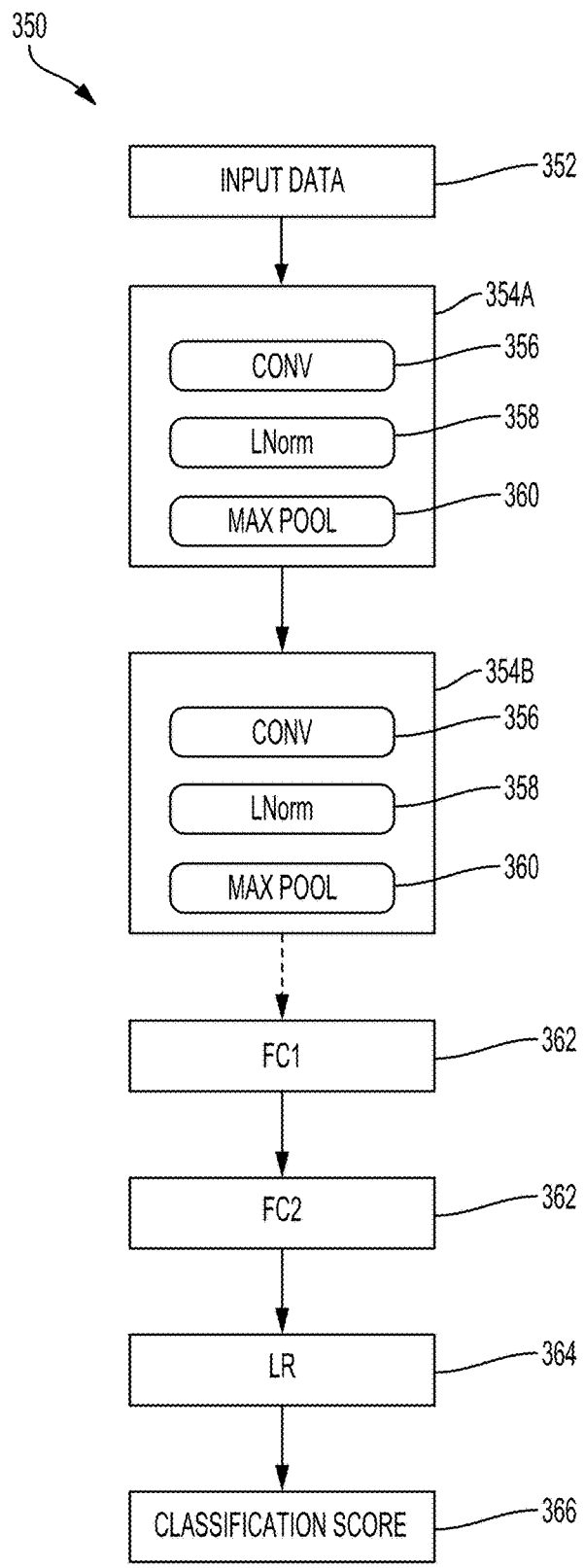

FIG. 3E is a block diagram illustrating an exemplary deep convolutional network 350. The deep convolutional network 350 may include multiple different types of layers based on connectivity and weight sharing. As shown in FIG. 3E, the exemplary deep convolutional network 350 includes multiple convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two convolution blocks 354A, 354B are shown, the present disclosure is not so limiting, and instead, any number of convolutional blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 400 may access other processing blocks that may be present on the SOC 100, such as processing blocks 114 and 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each layer 356, 358, 360, 362, 364 may serve as an input of a succeeding layer 356, 358, 360, 362, 364 in the deep convolutional network 350 to learn hierarchical feature representations from input data 352 (e.g., images, audio, video, sensor data and/or other input data) supplied at the first convolution block 354A. The output of the deep convolutional network 350 is a classification score 366 for the input data 352. The classification score 366 may be a set of probabilities, where each probability is the probability of the input data including a feature from a set of features.

Various devices may perform two-dimensional (2D) image analysis. For example, autonomous vehicles may include an image sensor for capturing 2D images. From the 2D images, the devices may perform 2D image analysis for object detection, part localization, and/or segmentation. For example, the 2D image analysis may be used to find cars in an image. Conventional devices (e.g., conventional systems) that perform 2D image analysis may be referred to as conventional object detection systems, conventional object tracking systems, conventional vision systems, or conventional computer vision systems.

Figure 4A:
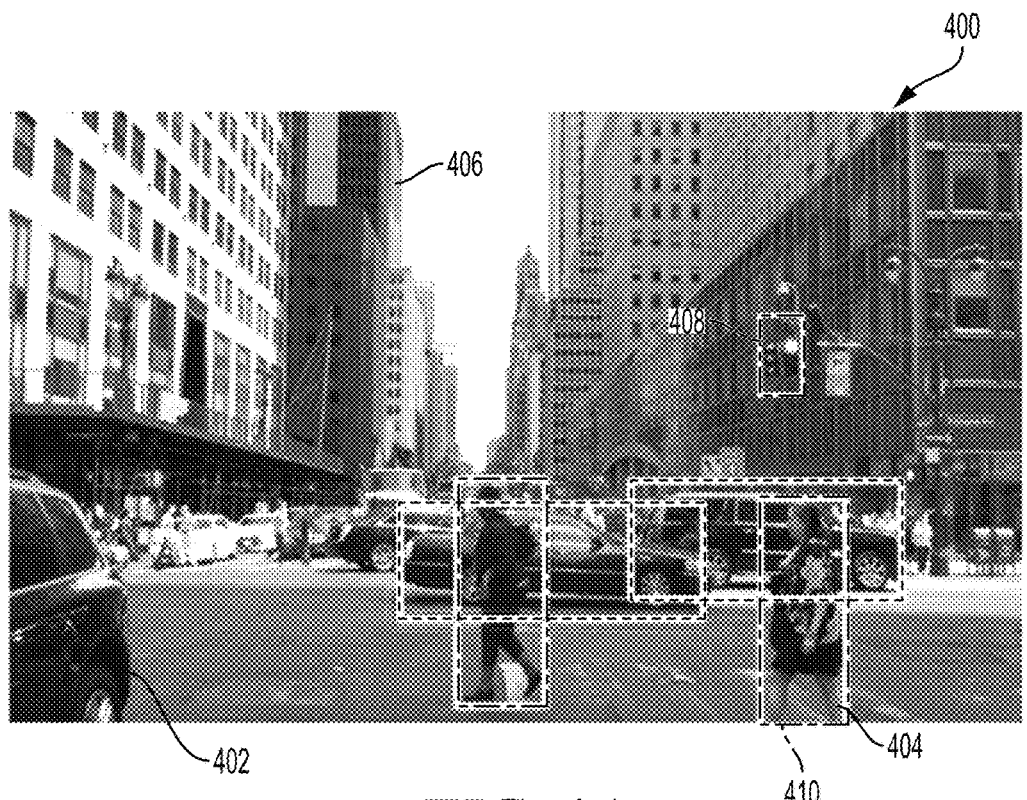
FIG. 4A illustrates an example of 2D image analysis in accordance with aspects of the present disclosure.

FIG. 4A illustrates an example of 2D image analysis. As shown in FIG. 4A, the 2D image analysis is performed on a 2D image 400. The 2D image 400 may include various real objects, such as cars 402, people 404, buildings 406, and traffic signals 408. Based on a given task, the 2D image analysis may find specific objects from the various objects located in the 2D image 400. For example, for an autonomous vehicle, the 2D image analysis is tasked with identifying cars 402, people 404, and traffic signals 408. Each of the identified cars 402, people 404, and traffic signals 408 may be bound by a bounding box 410.

The 2D image analysis performed by conventional systems is limited in functionality. For example, the 2D image analysis cannot predict motion, estimate a viewpoint, and predict depth. In contrast, a three-dimensional (3D) model assisted image analysis may perform, at least, object detection, viewpoint estimation, part localization, segmentation, spatial position reasoning (e.g., depth perception), and motion prediction. Viewpoint estimation refers to estimating the viewpoint (e.g. azimuth, elevation, and in-plane rotation angles) of an object. For example, the 3D model assisted image analysis may be used in an autonomous vehicle to determine: where another car is heading; which car is closest to the autonomous vehicle; will the autonomous vehicle hit a pedestrian given the pedestrian's estimated path; and/or will the autonomous vehicle run a red light.

Figure 4B:
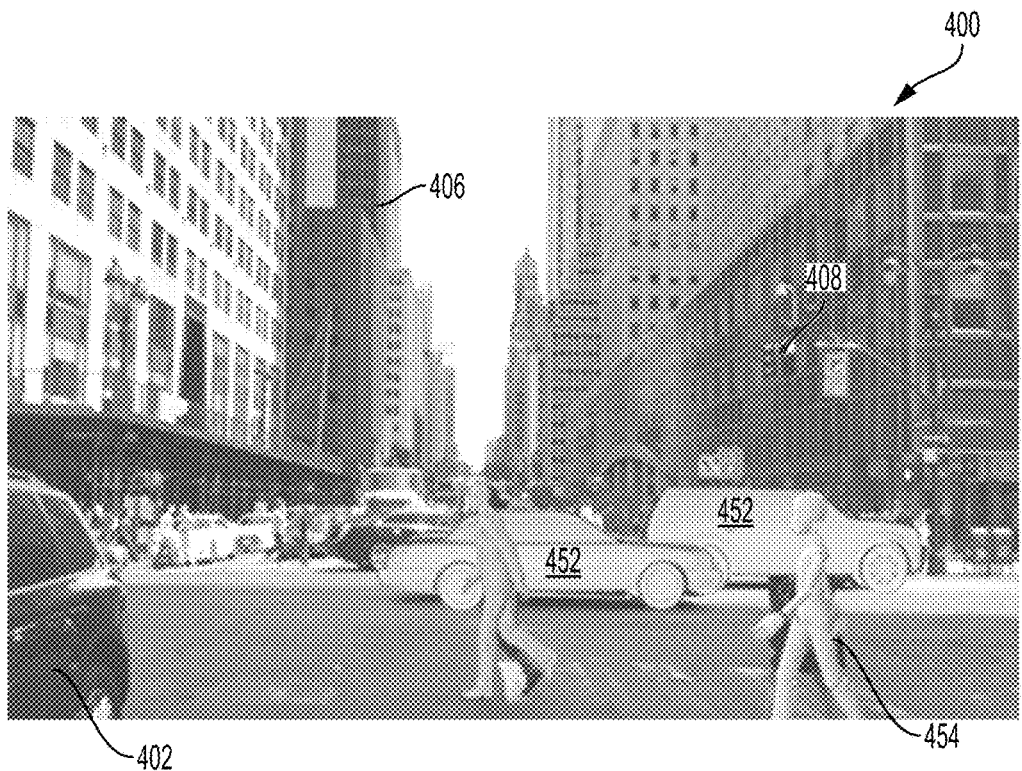
FIG. 4B illustrates an example of 3D image analysis in accordance with aspects of the present disclosure.

FIG. 4B illustrates an example of 3D model assisted image analysis according to aspects of the present disclosure. As shown in FIG. 4B, the 3D model assisted image analysis is performed on the 2D image 400 captured by an image capturing device (not shown). The 3D model assisted image analysis may detect various objects from the 2D image 400. For example, the 3D model assisted image analysis may detect cars 452, people 454, and traffic signals 456. Upon detecting the cars 452, people 454, and traffic signals 456, the 3D model assisted image analysis obtains possible renderings (e.g., 3D models) for one or more detected objects (e.g., cars 452 and people 454). The various objects (e.g., cars 452 and people 454) may be detected based on a task of the autonomous vehicle. For example, if the vehicle is tasked with collision avoidance, the vehicle may detect other vehicles and pedestrians.

Figure 5:
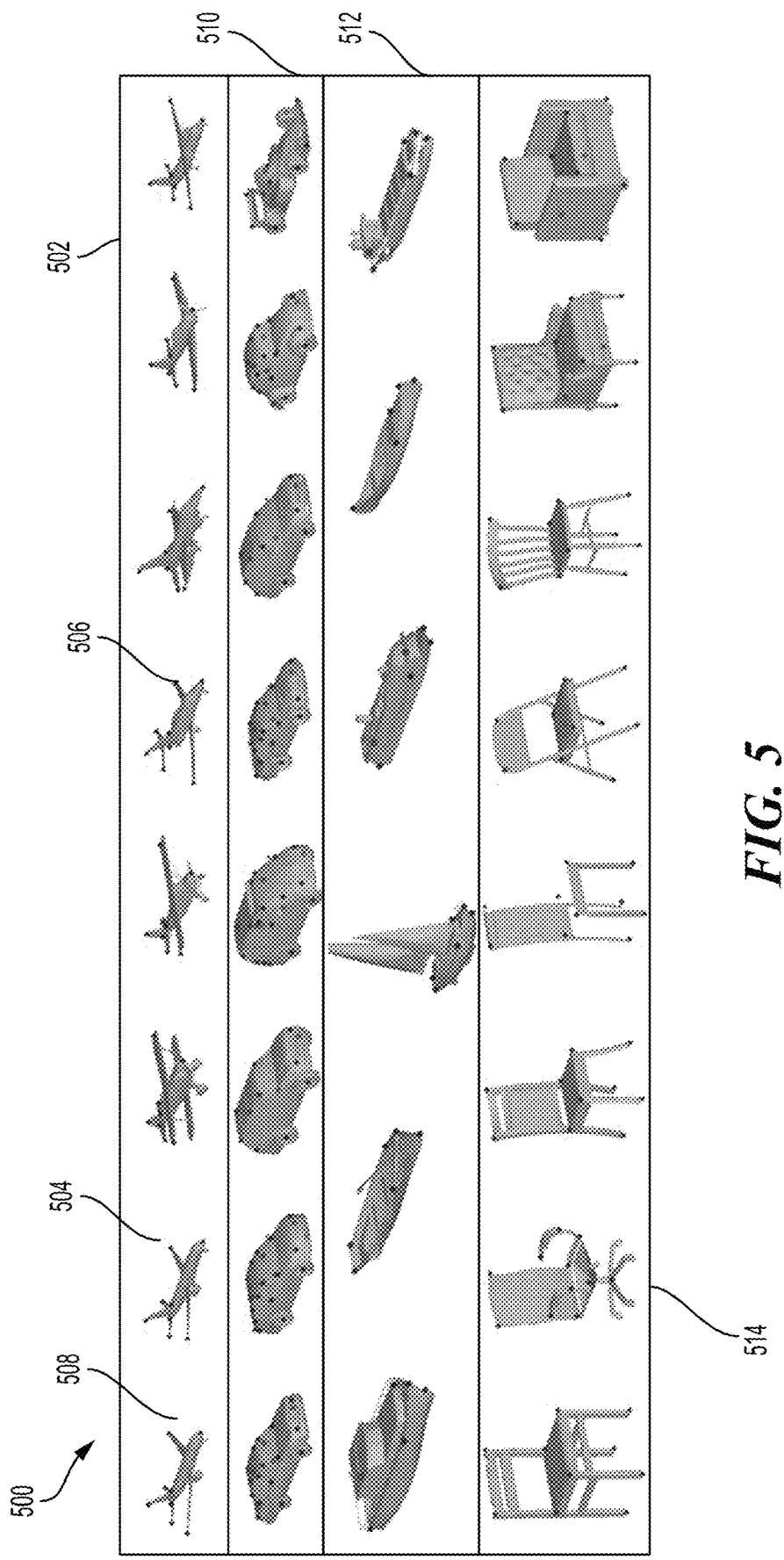
FIG. 5 illustrates an example of a 3D model library in accordance with aspects of the present disclosure.

In one configuration, the 3D model assisted image analysis obtains various 3D models of cars, from a dataset (see FIG. 5), for the cars 452 detected in the 2D image 450. The 3D models are derived for the class of the object and are not derived specifically for the instance of the object. For example, if one of the cars 452 is a two door convertible, the obtained 3D models is not specifically the two door convertible. Rather, the 3D models are models of types of cars in general. As shown in FIG. 5, the models may include different types of cars, such as a coupe, sedan, van, truck, ambulance, etc.

For each possible 3D model corresponding to an object (e.g., cars 452, people 454, and traffic signals 456), a geometric differential module computes the geodesic distance (e.g., geodesic distance value) between the 3D model and the object. After traversing each 3D model, the geometric differential module selects the 3D model (e.g., rendered image) corresponding to a smallest geodesic distance. Furthermore, the 3D model parameters from the selected 3D model may be transferred to the cars 452 and the people 454. Of course, the 3D models are not limited to 3D models of cars 452 and people 454. 3D models may be rendered for other objects in the image 400, such as the traffic signal 408 or buildings 406. As shown in FIG. 4B, the 3D models are textureless whereas the objects in the image 400 are textured.

FIG. 5 illustrates an example of a library of 3D computer-aided design (CAD) models 500 (e.g., rendered images) according to aspects of the present disclosure. As shown in FIG. 5, each class 502, 510, 512, 514 (e.g., object category) includes various sub-categories (e.g., fine grained categories). For example, a plane class 502 may include sub-categories of different types of planes, such as a bi-plane 504, fighter jet 506, passenger plane 508, etc. The library may also include 3D models for a car class 510 including different types of cars, a boat class 512 including different types of boats, and a chair class 514 including different types of chairs. Other types of classes are also contemplated, and the library is not limited to the classes 502, 510, 512, 514 of FIG. 5. The 3D models may be obtained from known datasets, such as ShapeNet. Additionally, or alternatively, a specific dataset may be generated based on aspects of the present disclosure.

As previously discussed, aspects of the present disclosure are directed to 3D-to-2D object alignment. That is, given a library of 3D models (e.g., 3D CAD models) from various object categories and their sub-categories, the system finds the 3D model that best matches the object in an image. 3D-to-2D object mapping improves system performance (e.g., reduces processor and memory load) because the system does not need to build a completely new 3D model from scratch for every new image. Still, the precision of 3D-to-2D object alignment may be constrained by the accuracy of the 3D models with respect to the objects in 2D images.

Figure 6:
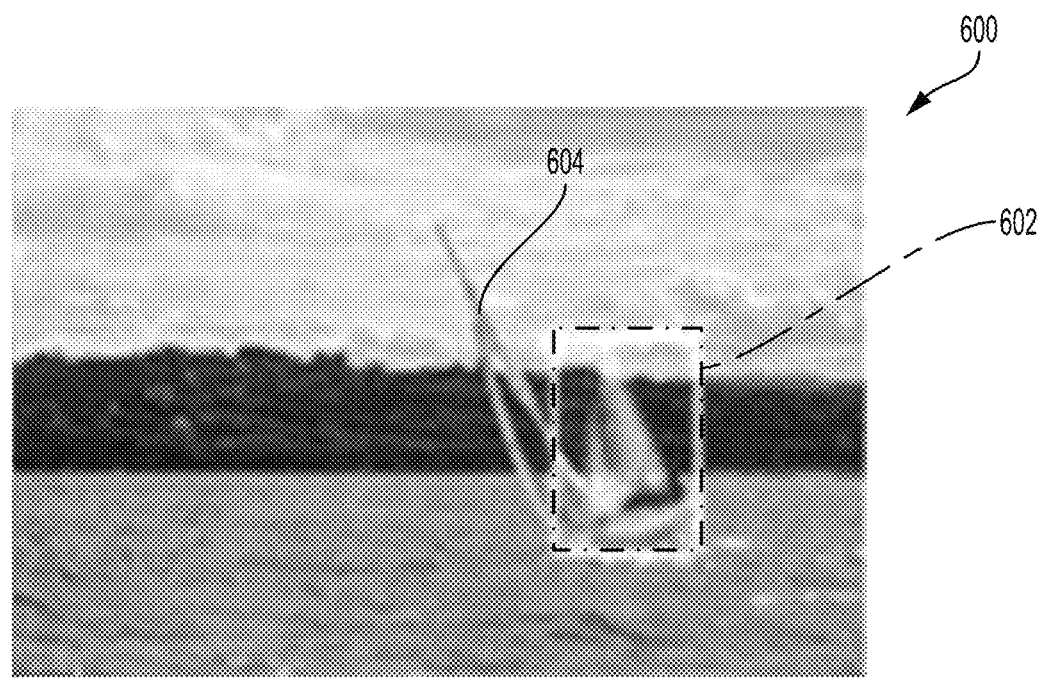
FIGS. 6 and 7 illustrate examples of aligning 3D models to objects in accordance with aspects of the present disclosure.

FIG. 6 illustrates an example of a 3D model 602 aligned to match a 2D view of a sailboat 604 in an image 600. In conventional systems, the 3D model 602 may be aligned by humans or an artificial neural network (e.g., machine learning network). In practice, hand selected 3D models may not be a good fit for the actual object, let alone those predicted from a machine learning model. For example, as shown in FIG. 6, the 3D model 602 of the sailboat is misaligned with the 2D view of the sailboat 604. The misalignment may be due to an imperfect 3D model and/or an imprecise pose given to a 3D model. Thus, it is desirable to have a model that is invariant to the actual 3D models and poses viewed during training. Furthermore, it is desirable to provide a more accurate alignment in comparison to the alignment performed by a human.

In conventional systems, there may be various reasons for a misalignment of a 3D model to a 2D object. For example, misalignment may be due to imperfect 3D models and/or imprecise poses of a 3D model. It is desirable to have a model that is invariant to the actual 3D models and poses viewed during training. In one configuration, an alignment model does not consider how well it encodes particular 3D models or poses. Rather, the alignment model considers how well a given 3D model, in a specific pose, fits an object in a 2D image. Thus, even if the 3D models available during training do not correlate to all 2D objects, the 3D CAD library may be expanded after training (e.g., during testing). Additionally, the alignment model may evaluate new poses (e.g., poses that were not observed during training). That is, during training, the alignment model may align 3D models and poses to 2D objects. During testing, the model may transfer the alignment functionality to novel 3D CAD models and test poses for 2D objects that were not seen during training. Specifically, the alignment model is transferable to new objects.

For 3D-to-2D object alignment, conventional systems use exemplar classifiers that are trained to model an absolute relation between particular CAD views and particular object appearances via texture-sensitive features, such as a histogram of oriented gradients. In conventional systems, exemplar classifiers are trained for specific models and specific poses. Namely, conventional systems learn an absolute relation between the 2D view of an object and the 3D model and pose. Therefore, conventional systems cannot accommodate new 3D models or poses without retraining.

In contrast to conventional systems, aspects of the present disclosure do not model absolute relations between 3D models and 2D views of objects. Rather, as discussed above, aspects of the present disclosure are directed to alignment transferability for 3D-to-2D object alignment. In one configuration, a geometric differential subnetwork is implemented as a two-stream convolutional neural network (e.g., shallow convolutional neural network) that accounts for the relative differences between 3D model views and 2D object views.

In one configuration, an object of interest x is detected in an image, such as a 2D image. The object may be detected by an object detector. For example, the object may be detected based on feature activations from a layer of a deep convolutional neural network. The appearance of the object is denoted by x. For the object of interest, it is assumed that there is an associated (e.g., hypothetical) 3D model $g_x^*$. It is also assumed that there is a library of 3D models $g_k$, k=1, . . . , K that describes a variety of object categories and corresponding sub-categories, where K is the number of sub-categories (e.g., specific types of planes) under each object category (e.g., plane) (see FIG. 5).

Figure 7:
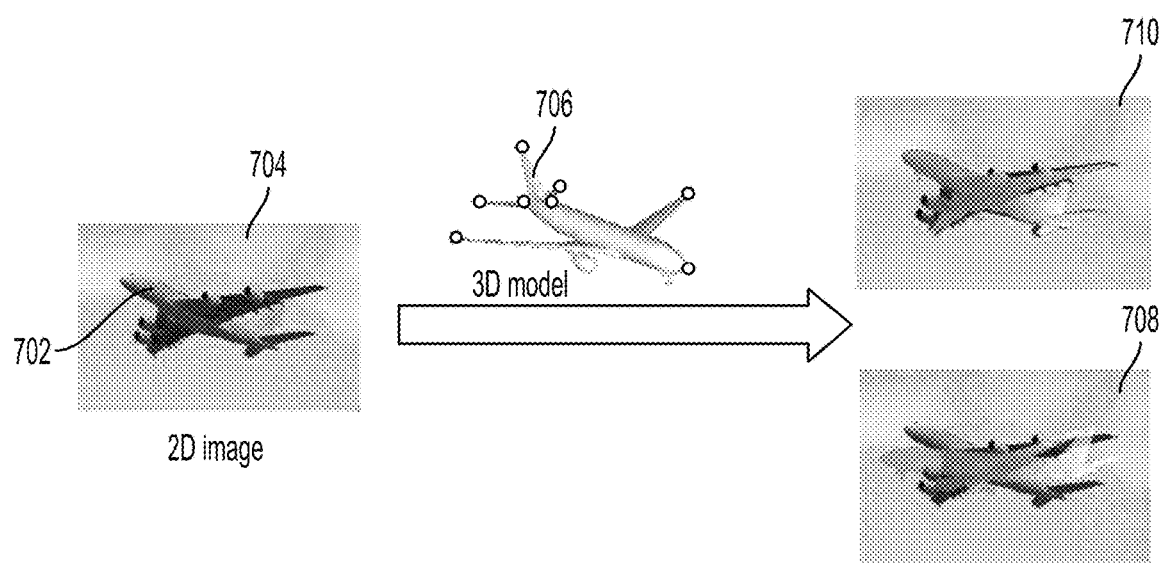

FIG. 7 illustrates an example of 3D-to-2D object alignment according to aspects of the present disclosure. As shown in FIG. 7, an object 702 is detected in a 2D image 704. In this example, the vision system determines that the object is an airplane. After detecting the object 702 from the 2D image 704, one or more 3D models 706 are selected for alignment with the object 702.

Various instances (e.g., poses) of the 3D model 706 may be compared to the object 702. That is, the 3D model 706 may be transformed to different instances by applying different pose parameters. As shown in a first alignment example 708, a first instance of the 3D model 706 is misaligned with the object 702. As shown in a second alignment example 710, a second instance of the 3D model 706 has a better fit to the object 702 in comparison to the first instance from the first alignment example 708. Thus, because the second instance has a better fit in comparison to the first instance, the pose parameters used to generate the second instance may be transferred to the object 702.

In one configuration, each 3D model $g_k$ may undergo a transformation based on pose parameters $\phi_{CAD}$. The pose parameters $\phi_{CAD}$ include extrinsic parameter transformations (e.g., azimuth a, elevation e, in-plane rotation θ, and camera distance d), as well as intrinsic parameter transformations (e.g., principle offset (u, v), focal length f, and viewport m). Some parameters, such as camera distance d, may be pre-determined or fixed. The pose parameters $\phi_{CAD}$ of an instance of a 3D model that has a best fit with a 2D image of an object of interest may be used to determine information regarding the object of interest. For example, one or more of the pose parameters $\phi_{CAD}$, such as the azimuth a, elevation e, and in-plane rotation θ, may be used for a viewpoint estimation of the object of interest. A projection matrix may be as follows:

$$P = \underbrace{\begin{bmatrix} mf & 0 & u \\ 0 & mf & v \\ 0 & 0 & 1 \end{bmatrix}}_{\text{intrinsic parameters}} \cdot \underbrace{[\underbrace{Rot(a, e, \theta)}_{3\times 3} \underbrace{Trans(a, e, d)}_{3\times 1}]}_{\text{extrinsic parameters}},$$

where a calibrated camera is assumed. For example, it is assumed the focal length and viewport are fixed to f=1, m=2,000, respectively. To reduce notation clutter, the parameters are grouped into the pose parameters $\phi_{CAD}$. Each set of values in the pose parameters $\phi_{CAD}$ produces a new 3D model instantiation. The hypothetical 3D model $g_x^*$ is associated with an ideal transformation vector $\phi_x^*$. Rot( ) is a (3×3) rotation matrix, and Trans( ) is a (3×1) translation vector. The two form a 3×4 extrinsic matrix parameter.

Aspects of the present disclosure are directed to inferring the 3D model instantiation, which is obtained from a best match of a 3D model (e.g., rendering) to the 2D image of the object of interest. That is, aspects of the present disclosure are directed to finding, among a set of possible instantiations $g_k$, the best fit to ($g_x^*$, $\phi_x^*$). In one configuration, a best match is determined between the model alignment of a 3D model instantiated with pose parameters $\phi_{CAD}$ and the real, but unavailable, 3D model object parameters $\phi$ of the object of interest x. The best match is determined by obtaining the domain of the geometric compatibility function G(.) at which the function values are maximized (argmax), $$\phi_x = \underset{\phi}{\operatorname{argmax}} G(\phi; x, x_{CAD}, \phi_{CAD}), \quad (1)$$

where $x_{CAD}$ is the rendered image of the object of interest x, given the pose parameters $\phi_{CAD}$. In one configuration, a geometric compatibility function is defined as a differential on the geometric space. In contrast to the explicit mapping of conventional vision systems, the geometric compatibility function improves the ability of the vision system to align 3D models to new objects (e.g., 2D objects that have not been previously seen by the vision system).

During training, objects from two images (x and $x_{CAD}$) and two rotation matrices (R and $R_{CAD}$) are used. One object and rotation matrix (x, R) correspond to an object in a 2D image and another object and rotation matrix ($x_{CAD}$, $R_{CAD}$) are from a rendered image (e.g., 3D model). The object detected in the 2D image may be referred to as a real object. During training, the rotation matrix R of the real object is a ground-truth rotation matrix. The geometric compatibility function g( ) may be defined as:

$$G_{rel} \propto \partial \phi (R - R_{CAD}). \quad (2)$$

In equation 2, $g(R-R_{CAD})$ is a function of difference between two geometries expressed by the matrices R and $R_{CAD}$, such that $\partial \phi$ is a function differential. $G_{rel}^*$ is a true geodesic differential and $G_{rel}$ is an estimated geodesic differential. During testing, the rotation matrix R is not available, as the rotation matrix R is to be calculated. To this end, the geometric compatibility is approximated with another function $f( )$ that receives, as inputs, the appearance features of the 2D image x and the 3D model $x_{CAD}$ (e.g., rendering), namely:

$$G_{rel}^* \approx G_{rel} \propto \partial x = f(x - x_{CAD}), \quad (3)$$

where $\theta(\cdot)$ may be defined as a separate neural network module, such as a geometric differential module. The geometric differential module may be implemented as a standard fully connected layer with a single output. In contrast to a conventional fully connected layer which operates as a function approximater, the geometric differential module approximates the differential.

That is, in conventional systems, the geometric compatibility function is implemented as a linear classifier that is executed over patches extracted from the textured examples rendered from the 3D models. Furthermore, conventional systems select the textured rendering that returns the maximum linear score:

$$G_{abs} \propto \phi^i_{CAD} x. \quad (4)$$

In conventional systems, the pose parameters $\phi_{CAD}$ are learned classifiers. The object parameters $\phi$ are transferred from the 3D model that is most similar to the input. That is, the object parameters $\phi$ are transferred from the parameters $\phi_{CAD}$ with the highest classification score. Accordingly, conventional systems learn a direct association between a geometry space (e.g., $\phi_{CAD}$) and an appearance space x. Based on the learned association, conventional systems add texture to the synthesized 3D renderings.

Synthesized textures are not infinite and are not as realistic as textures of real objects. Furthermore, conventional systems explicitly enumerate all possible pose instantiations of the 3D model, as defined by different rotation matrices $R_{CAD}$. Yet, during training or testing, a dense sampling of the rotation matrix space may not be available. As such, there may be a large number of classifiers and a limited number of training examples for each classifier. Finally, the inference is defined as the maximization of equation 4, where the parameters $\phi_{CAD}$ have a numerosity equal to the cross product of all the possible variations (e.g., [# textures]×[# rotations]×[# other factors]). The number of parameters $\phi_{CAD}$ increases the computational complexity of conventional systems, thereby limiting the performance of conventional systems (e.g., increased processor use, increased memory use, etc.).

Aspects of the present disclosure are directed to improving the performance (e.g., reducing processor use, reducing memory use, etc.) of vision systems for aligning 3D models to an object in a 2D image. Specifically, aspects of the present disclosure propagate pose parameters of a 3D model to the object in the 2D image. In contrast to the absolute approach of conventional systems, the geometric compatibility function is relative.

That is, the geometric differential module does not output rotation matrices R or 3D model instantiations $\phi$. Rather, the geometric differential module returns relative geometric compatibility values. That is, the geometric differential module may be trained to regress on the difference of the parameters $\phi_{CAD}$ from the 3D model instantiations $\phi$, based on the appearance features of an image x and a rendered image $x_{CAD}$. In one configuration, the geometric differential module learns to estimate the alignment discrepancy between a 2D object and a 3D rendering. By estimating the aforementioned alignment discrepancy, aspects of the present disclosure avoid computing an objects rotation matrix and improve performance (e.g., reducing processor use, reducing memory use, etc.) of vision systems for rendering 3D models to an object in a 2D image.

According to aspects of the present disclosure, the compatibility score function in equation 3 (e.g., $f( )$) is not associated with the appearance of particular renderings at training time. That is, the geometric differential module does not make any assumptions regarding the texture appearance of the 3D rendering or the geometric precision of the 3D model for a given object. More specifically, in contrast to conventional systems, the geometric differential model does not associate the geometric compatibility function G( ) of equation 1 with the appearance of the rendering.

The geometric differential model does not consider the geometric precision of the 3D model. Thus, the geometric differential module may still predict the 3D model parameters $\phi$ that match the 2D object of interest even if the 3D model is not a substantially perfect fit to the 2D object. The 3D model may not be a substantially perfect fit to the 2D object because the set of poses are limited and/or the geometry of the 3D model is not correct for the 2D object. For example, the model library may not include a 3D model of the object of interest. As an example, the 3D model library may only have models of a specific car (e.g., sports utility vehicle (SUV)). In this example, the image may include a different type of car (e.g., coupe). Therefore, the existing models may not be an absolutely correct fit, as a 3D model of an SUV does not match a 2D image of a coupe. Nonetheless, the geometric differential module returns the best possible fit, as the matching maximizes the alignment similarity with the available models. The geometric differential module does not depend on classifying the appearance of the object of interest to the 3D model In one configuration, the geometric differential module returns a compatibility score for each 3D model instantiation. Furthermore, the geometric differential module may return a compatibility score for 3D models that were not observed during training. That is, the geometric differential module is not limited to matching what it has already seen. Rather, the geometric differential module has learned how to match based on any 3D model instantiations provided to it at test time. Accordingly, the model may cope with dynamically expanding 3D model instantiations. That is, aspects of the present disclosure are not limited to a specific number of 3D models at test time. The dynamic expansion of 3D models may be due to newly added 3D models. Additionally or alternatively, the dynamic expansion of 3D models may be due to a finer discretization of the rotation space.

In one configuration, the geometric differential module approximates the geodesic distance between two rotation matrices. Aspects of the present disclosure are not limited to approximating the geodesic distance between two rotation matrices as other geometric differentials (e.g., anchor flow distance) may be used, either as an alternative to the geodesic distance or in combination with the geodesic distance. To approximate the geodesic distance $G^*_{rel}$, the geometric differential module may use the rotation matrix of the real object R and the rotation matrix of the rendered image $R_{CAD}$ as follows:

$$G^*_{rel} = \frac{\|\log(R^T, R_{CAD})\|^2 F}{\sqrt{2}}, \tag{5}$$

where F is a probative norm and T is the transpose operation of the rotation matrix of the real object R. During training, the rotation matrix of the real object R may be referred to as a ground-truth rotation matrix. Additionally, during training, a loss layer, such as a Euclidean loss layer, may calculate a loss L to determine the accuracy of the geometric differential module prediction of $G_{rel}$ by relying on the appearance features of the real image x and the rendered image $x_{CAD}$. The loss L between the true geodesic differential $G^*_{rel}$ and the estimated geodesic differential $G_{rel}$ inferred via the geometric differential module is maximized, $$L = |G^*_{rel} - G_{rel}|^2. \tag{6}$$

In one configuration, the geometric differential module may be implemented as a two-stream architecture, where each stream is a convolutional network. In this configuration, a 2D image stream receives, as an input, the 2D images of the object of interest. The 2D image stream may determine (e.g., describe) the object's geometry. The rendering stream receives, as an input, a textureless, 3D rendering from a particular 3D model instantiation that corresponds to the object candidate geometry. The two streams may be fused with convolutional pooling using a kernel size, such as 1×1. The geometric differential module may be a fully connected module with a single output. The output predicts the geometric compatibility score for each rotation matrix from the 3D renderings. That is, the geometric differential module does not output rotation matrices.

During training, the network learns to estimate the alignment discrepancy between a 2D image and a 3D rendering. Based on the training, the network does not compute an object's rotation matrix, thereby improving performance of the network. In one configuration, during training, a real image is sampled, for which the ground truth 3D model instantiation is available. To improve an ability to estimate the geodesic distance between different rotation matrices, estimates for different object distance are available. That is, estimates are provided for objects that are close to the camera as well as estimates for objects that are far from the camera. Furthermore, to improve the accuracy of the regression model, a stratified sampling of the space of the rotation matrices are used during training.

For example, per training image, the network samples: (i) rotation matrices that are substantially equal to the ground truth rotation matrix; (ii) rotation matrices that are similar but not equal to the ground truth rotation matrix; and (iii) rotation matrices that are substantially different from the ground truth rotation matrix. In total, multiple different rotation matrices are used for each training image. During testing, and given one image, possible rendering instantiations are traversed. The best matched (e.g., highest confidence) is retained, namely, the 3D model instantiation having the rendering with the smallest geodesic distance to the input 2D image.

Figure 8:
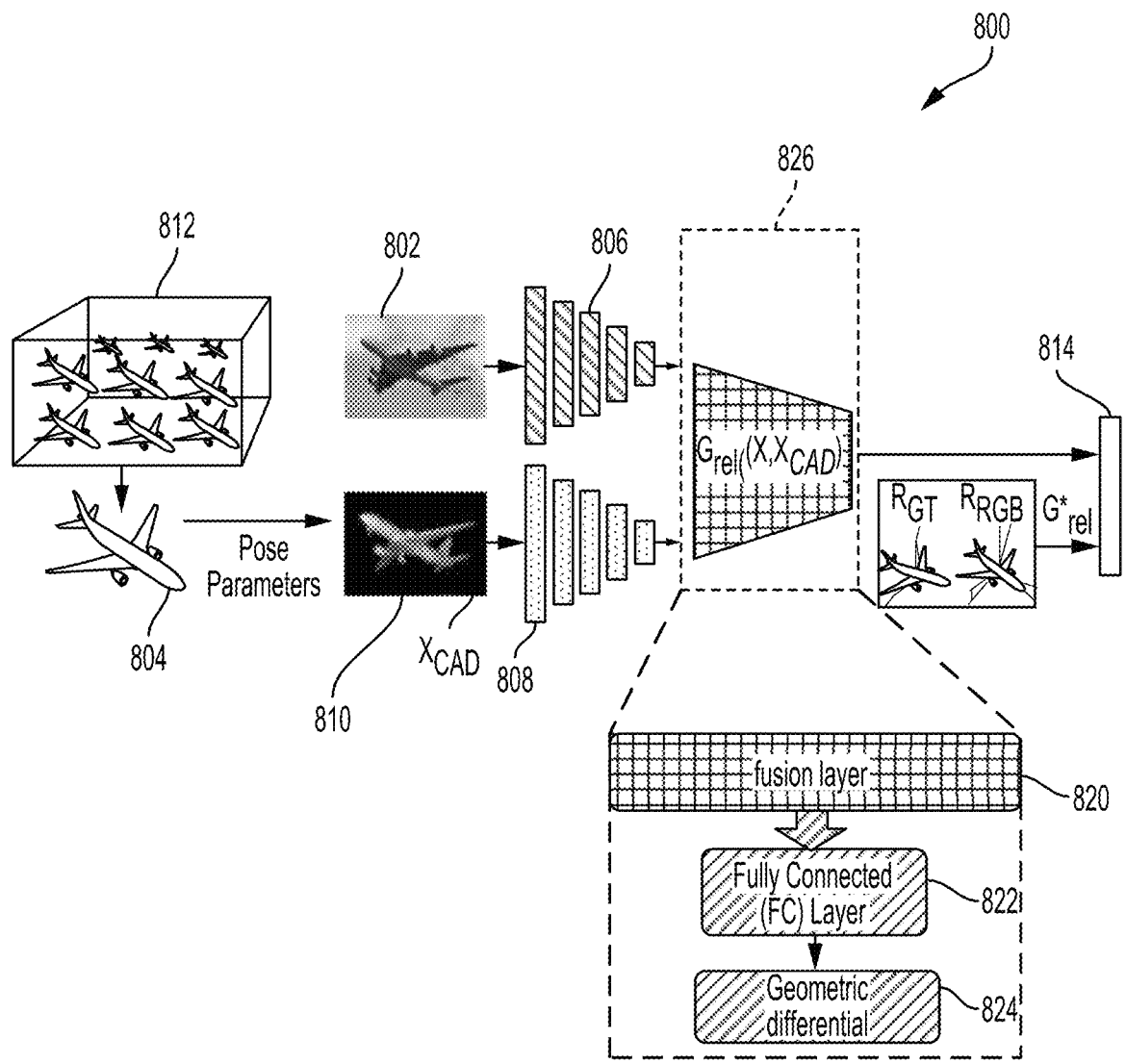
FIG. 8 illustrates an example of an artificial neural network for identifying a 3D model for alignment with an object in accordance with aspects of the present disclosure.

FIG. 8 illustrates an example of an artificial neural network 800 for determining a geodesic differential between an object 802 detected in a 2D image (e.g., RGB image, real image) and a 3D model 804. As shown in FIG. 8, the artificial neural network 800 is a two-stream network. Each stream may be a convolutional network. A first stream 806 (e.g., RGB convolutional network) receives, as an input, the object 802. The object 802 may be referred to as the object of interest. During testing (e.g., real world use), the object 802 may be detected in an image captured from an image sensor (e.g., camera). The second stream 808 (e.g., render convolutional network) receives, as an input, an instantiation 810 of the 3D model 804 selected from a 3D model library 812.

That is, the artificial neural network selects a 3D model 804 from a 3D model library 812. The 3D model 804 corresponds to the object detected in the 2D image. In one configuration, the 3D model 804 is not derived specifically for an instance of the object 802. Rather, the 3D model 804 is derived for a class of the object 802. For example, if the object 802 is a specific model and type of car (e.g., red two door convertible), the 3D model 804 is not derived for the specific model. Instead, the 3D model 804 is derived for the class (e.g., car or sports car).

The 3D model 804 may be a mesh model. After selecting the 3D model 804, the artificial neural network 800 renders the 3D model 804 and transforms the model via pose parameters $\phi_{CAD}$. The transformation comprises adjusting the pose and other parameters of the 3D model 804. Each transformation of the 3D model 804 may be referred to as an instantiation. Multiple instantiations of the 3D model 804 may be compared to the object of interest to identify the instantiation with the best fit. In one configuration, the 3D rendering 804 is textureless. Additionally, the object 802 may be textured.

Each stream 806, 808 generates a feature map of the corresponding input (object 802 and 3D rendering 810). The feature maps may be received at a geometric differential subnetwork 826. In one configuration, the geometric differential subnetwork 826 estimates the geodesic distance between the two inputs based only on appearances. The geodesic distance may be determined based on rotation matrices of the real object and the rendered object as shown in equation 5.

In another configuration, the geometric differential subnetwork 826 estimates the anchor flow distance between the 2D object 802 and the 3D rendering 810. For example, each 3D rendering 810 may include a set of M anchors (e.g., 3D points marked on a CAD model). When rotating the 3D rendering 810, the anchors M are also rotated. The location of anchors M rotated by a ground truth rotation matrix (e.g., a rotation matrix for the 2D image) is defined as $\{x_i\}$, the location of anchors M rotated by estimated rotation matrix is defined as $\{\tilde{x}_i\}$. The anchor flow distance may be determined as follows, where M is the set of anchors:

$$\Sigma_{i=1}^{M} \|x_i - \tilde{x}_i\|_2 \tag{7}$$

The geometric differential subnetwork 826 outputs the geodesic differential for each pose. After traversing through each pose in a dataset, the artificial neural network 800 identifies the pose with the smallest geodesic differential. After identifying the pose, the pose parameters are propagated to the object 802. The pose parameters may be used for 3D image analysis, such as identifying the object's orientation, the object's distance relative to the device, and/or a movement direction of the object 802. The pose parameters assist the vision system with navigation, depth perception, and/or decision making. For example, the pose parameters may assist the vision system of a vehicle (e.g., car, robot, or drone) in determining whether objects are going towards or away from the vehicle.

The geometric differential subnetwork 826 may include a fusion layer 820 for fusing the feature maps. The fusion layer 820 receives two feature maps as an input and outputs a merged feature map. Additionally, as shown in FIG. 8, the geometric differential subnetwork 826 includes a fully connected layer 822 to receive an input from the fusion layer 820. The geometric differential module 824 outputs the geodesic differential. FIG. 8 illustrates one fully connected layer 822 between the fusion layer 820 and the geometric differential module 824. Aspects of the present disclosure are not limited to one fully connected layer 822, as more fully connected layers 822 may be defined between the fusion layer 820 and the geometric differential module 824. Alternatively, the geometric differential subnetwork 826 may not include the fully connected layer 822.

During training, a loss layer 814 (e.g., Euclidean loss layer) is specified to determine the loss L between a ground-truth geodesic distance and the estimated geodesic distance from the geometric differential module. The loss layer 814 may be used during training and is not used during testing (e.g., real world use). The loss is backpropagated to improve the prediction of the geodesic distance. For example, as shown in FIG. 8, the geometric differential subnetwork 826 outputs an estimated geodesic differential $G_{rel}$. Furthermore, during training, a ground-truth rotation matrix $R_{GT}$ of a 3D model and a rotation matrix of a training image $R_{RGB}$ are used to determine the ground-truth geodesic distance $G^*_{rel}$. The loss layer 814 computes the loss (L) between a ground-truth geodesic distance $G^*_{rel}$ and the estimated geodesic distance $G_{rel}$.

During training, the object 802 is selected from a set of images, with each image having a corresponding ground truth 3D model instantiation. The objective of training is to teach the artificial neural network 800 how to estimate the geodesic distance between rotation matrices (e.g., improve the process of estimating the geodesic distance). To improve the training, the artificial neural network 800 should receive examples of 3D model instances that are a close fit and a bad fit. A close fit refers to a 3D model instance with a geodesic difference from an object that is less than a threshold. A bad fit refers to a 3D model instance with a geodesic difference from an object that is greater than a threshold. For each training image, a set of rotation matrices with a close fit and a bad fit are used. The training may rely on stochastic gradient descent for backpropagation.

Figure 9A:
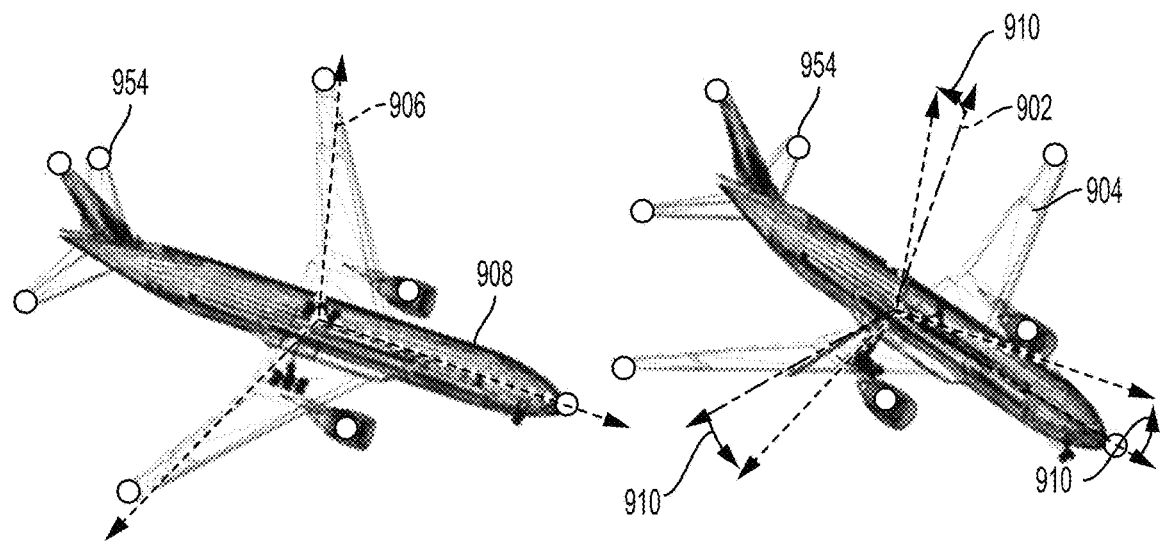
FIGS. 9A and 9B illustrate examples of determining a difference between 3D model instantiations in accordance with aspects of the present disclosure.

FIG. 9A illustrates an example of comparing a rotation axis 902 of a 3D model of a ground-truth of a real image 904 with a rotation axis 906 of a 3D model of a rendered image 908 according to aspects of the present disclosure. In FIG. 9A the rotation axes 902, 906 are visualized as x, y, and z axes of the 3D model. The artificial neural network may store each x, y, z axis as a matrix (e.g., rotation matrix). As shown in FIG. 9A, the distance between the rotation matrices 902, 906 is determined. A rendered image with rotation matrices having the smallest distance from the rotation matrices 902 of the real image 904 may be selected as being the best fit.

Figure 9B:
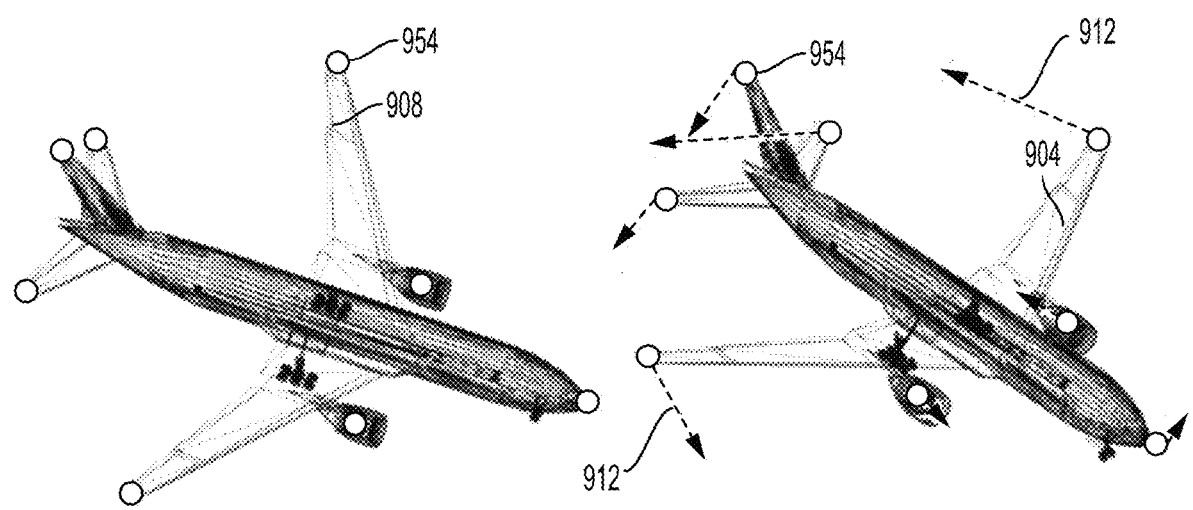

As shown in FIGS. 9A and 9B, each 3D model may include a set of anchors 954. The anchors 954 are 3D points marked on each model. The location of the anchors 954 are consistent between the 3D model of a rendered image 908 and the 3D model of a ground-truth of a real image 904. The anchors 954 may be used during training to determine an anchor flow distance. FIG. 9B illustrates an example of estimating an anchor flow distance a 3D model of a ground-truth of a real image 904 and a 3D model of a rendered image 908 according to aspects of the present disclosure. The anchor flow distance is determined based on equation 7. When rotating the 3D rendering, the anchors are also rotated. The location of anchors rotated by a ground truth rotation matrix is defined as $\{x_i\}$, the location of anchors rotated by estimated rotation matrix is defined as $\{\tilde{x}_i\}$. The anchor flow distance is determined based on a difference 912 between $\{x_i\}$ and $\{\tilde{x}_i\}$ (see equation 7).

Figure 10:
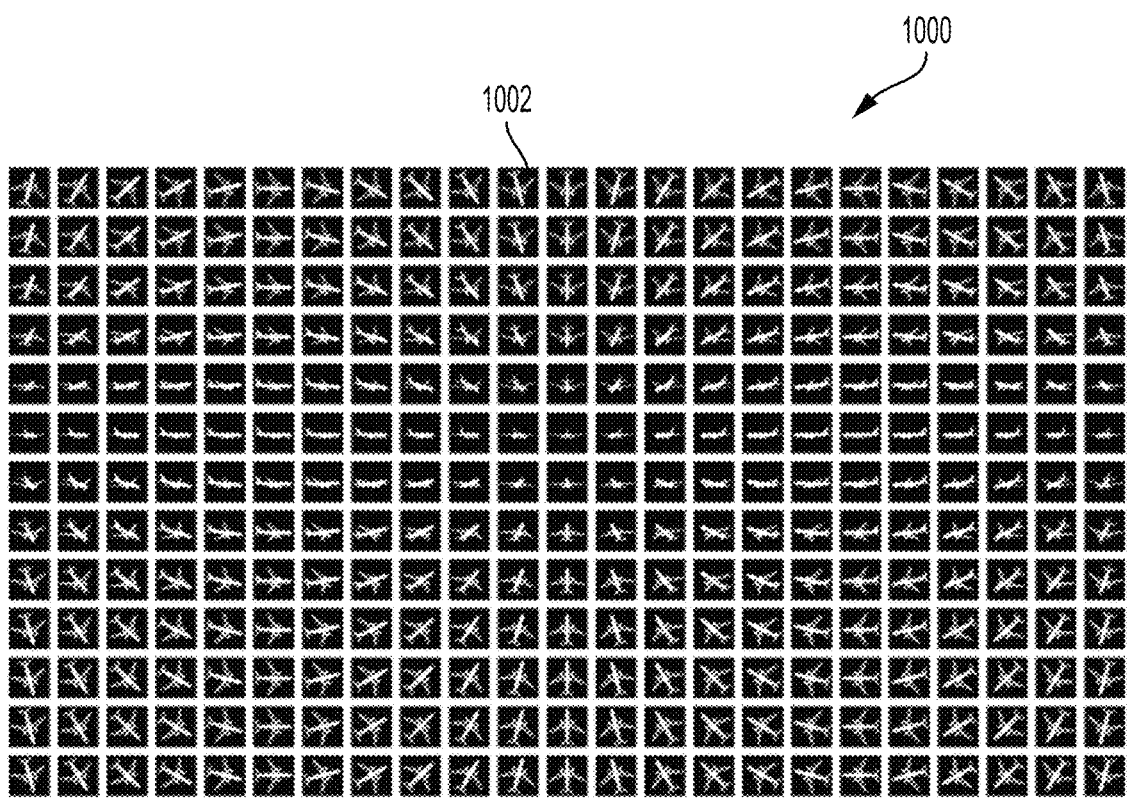
FIG. 10 illustrates an example of a discretized pose space of a 3D model in accordance with aspects of the present disclosure.

As previously discussed, during testing and given one 2D object, the geometric differential module traverses over multiple rendering instantiations. A dataset of a 3D model may include multiple discretized poses. Each discretized pose may be referred to as an instance. Additionally, or alternatively, one or more instances may be obtained by rotating (e.g., transforming) a pose obtained from a dataset. FIG. 10 illustrates an example of a discretized pose space of a 3D model according to aspects of the present disclosure. As shown in FIG. 10, the dataset 1000 includes various poses 1002 of an airplane. In one configuration, each pose 1002 is traversed to find a pose 1002 with a best fit to a 2D object. After finding the pose 1002 with the best fit, pose parameters of the selected pose are propagated to the 2D object.

Figure 11:
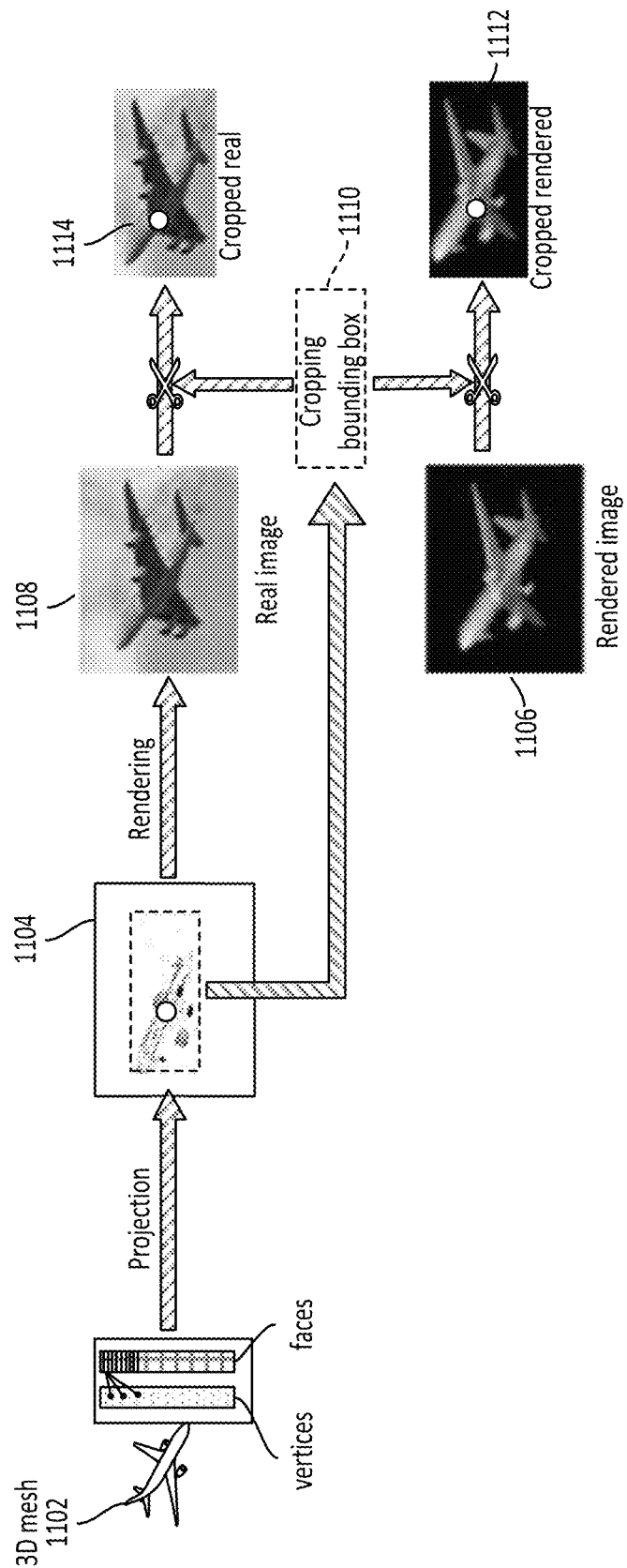
FIG. 11 illustrates an example of generating input images for an artificial neural network in accordance with aspects of the present disclosure.

As previously discussed, the 2D object and the 3D model may be cropped based on a bounding box before being input to an artificial neural network. FIG. 11 illustrates an example of cropping images according to aspects of the present disclosure. As shown in FIG. 11, a 3D mesh model 1102 is selected from a dataset. As shown in FIG. 11, a 3D mesh model 1102 is composed of vertices and faces. Vertices refer to 3D points that control the geometry, and faces define a topology between the vertices. The 3D mesh model 1102 may be transformed based on pose parameters to obtain an instance with a specific pose. For example, during training, the pose parameters may be used to generate a close fit instance and a bad fit instance. During testing, the pose parameters may be used to generate various instances. Accordingly, a transformed 3D model 1104 is obtained by applying the pose parameters to the 3D mesh model 1102.

The transformed 3D model 1104 may be rendered to obtain a textureless 3D model 1106 (e.g., rendered image). A size of an image of the 3D model 1106 may be based on a size of a 2D image 1108 that includes the object of interest. That is, a rendering canvas of the 3D model 1106 may have the same size as the RGB image 1108 (e.g., real image). The 3D model 1106 with the annotated pose is rendered onto the canvas. A bounding box 1110 may be determined based on the size of the transformed 3D model 1104. The 2D image 1108 and 3D model 1106 are cropped according to the bounding box 1110 to obtain a cropped 3D model 1112 and a cropped 2D image 1114. The cropped 3D model 1112 and the cropped 2D image 1114 are used as input data for respective streams of a two-stream network. By cropping the 2D image 1108 and 3D model 1106, the background is removed so that the two-stream network may focus on the object of interest.

Figure 12:
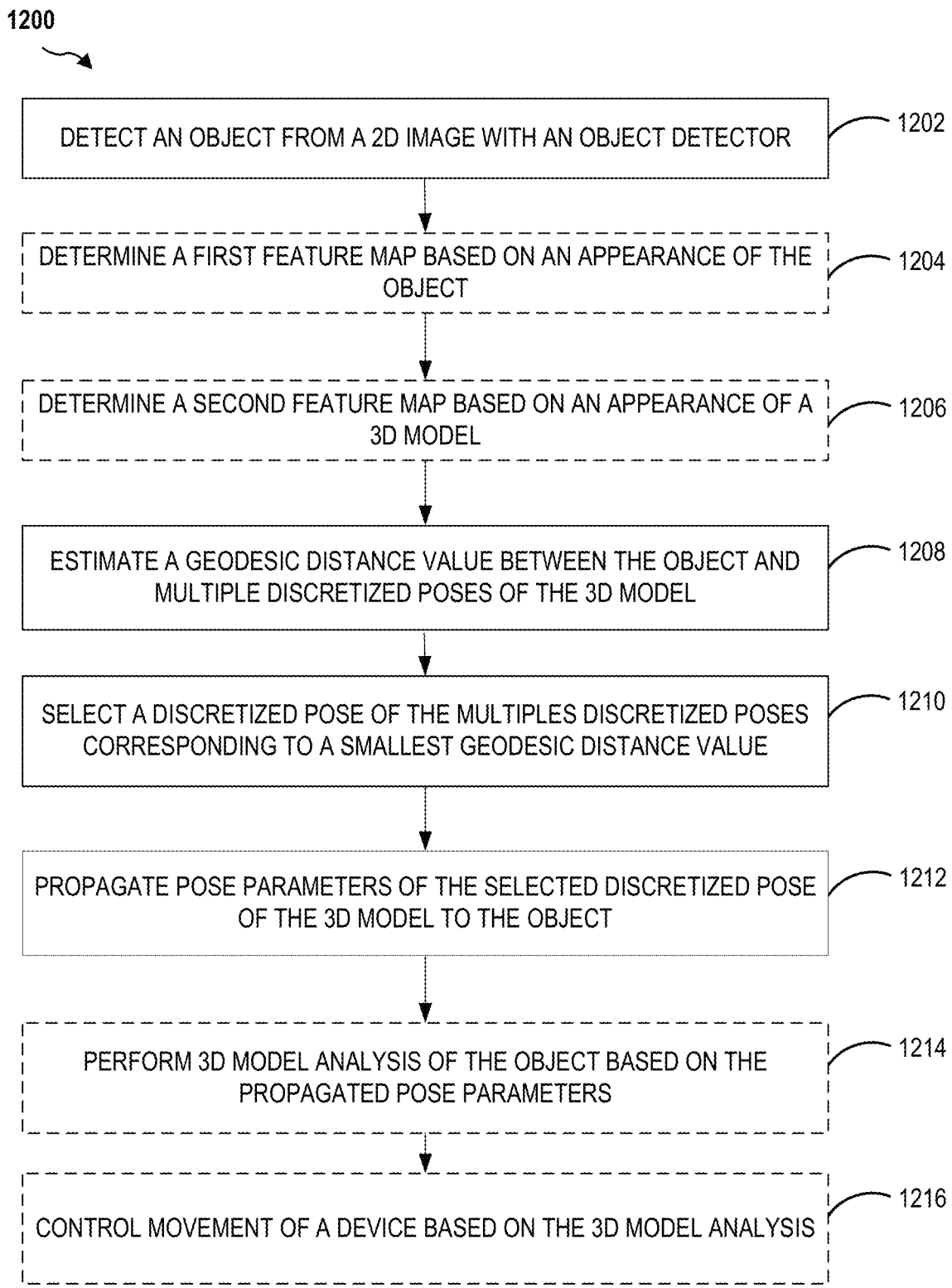
FIG. 12 illustrates a method for aligning a 3D model to an object of interest in a 2D image according to aspects of the present disclosure.

FIG. 12 illustrates a method 1200 for matching a 3D model to an object (e.g., 2D object) in a 2D image (e.g., RGB image), with an artificial neural network, according to an aspect of the present disclosure. As shown in FIG. 12, at block 1202 the artificial neural network detects an object in a 2D image with an object detector.

After detecting the object in the 2D image, in an optional configuration, at block 1204, the artificial neural network determines a first feature map based on an appearance of the object. The first feature map be determined from a first convolutional neural network of a two-stream neural network. In another optional configuration, at block 1206, the artificial neural network determines a second feature map based on an appearance of the 3D model. The second feature map is determined from a second convolutional neural network of a two-stream neural network. The 3D model belongs to a same class as the detected object. For example, if the artificial neural network detects that the object is a car, the artificial neural network selects a 3D model of a car. The 3D model may be the most similar rendering to the detected object. For example, if the detected object is a specific type or model of a car (e.g., two door convertible), the 3D model is the most similar rendering available in the library. The 3D model may be obtained from a 3D model library, such as the 3D model library of FIG. 5. In one configuration, the representation of the object is textured in the 2D image. In contrast, the 3D model is textureless.

At block 1208, the artificial neural network estimates a geodesic distance value between the object and multiple discretized poses of the 3D model. The geodesic distance may be determined based on the first feature map and the second feature map. The feature maps provide information about how much rotation is needed from the first geometric transform to the second geometric transform. For example, the artificial neural network is trained to predict (e.g., fit) the value of geodesic distance between two objects based on the first feature map and the second feature map. The training may be based on a distance between rotation matrices of the 3D model and the object. In another example, the training may be based on an anchor flow distance between anchor points in the 3D model and the object.

At block 1212, the artificial neural network selects a discretized pose of the multiple discretized poses corresponding to a smallest geodesic distance value. That is, the artificial neural network ranks the discretized poses of the 3D model based on the estimated geodesic distance value. The artificial neural network may select, from the ranked discretized poses, the discretized pose corresponding to the smallest geodesic distance value.

At block 1214, the artificial neural network propagates pose parameters of the selected discretized pose of the 3D model to the object. As discussed above, pose parameters (e.g., $\phi_{CAD}$) include extrinsic parameter transformations (e.g., azimuth a, elevation e, in-plane rotation θ, and camera distance d), as well as intrinsic parameter transformations (e.g., principle offset (u, v), focal length f, and viewport m). Some parameters, such as camera distance d, may be predetermined or fixed. In one configuration, the pose parameters of the selected 3D model are propagated to the object.

In an optional configuration, at block 1216, the artificial neural network performs 3D model analysis of the object based on the propagated pose parameters. The analysis may include, for example, determining an orientation of the object, a distance of the object relative to the device, and/or a movement direction of the object. In another optional configuration, at block 1218, the artificial neural network controls movement of a device based on the 3D model analysis. For example, the artificial neural network may control the movement of a car, a drone, a robotic device, or another type of vehicle based on the 3D model analysis. In one example, the artificial neural network may control the car to avoid a collision with another car based on the 3D model analysis.

Figure 13:
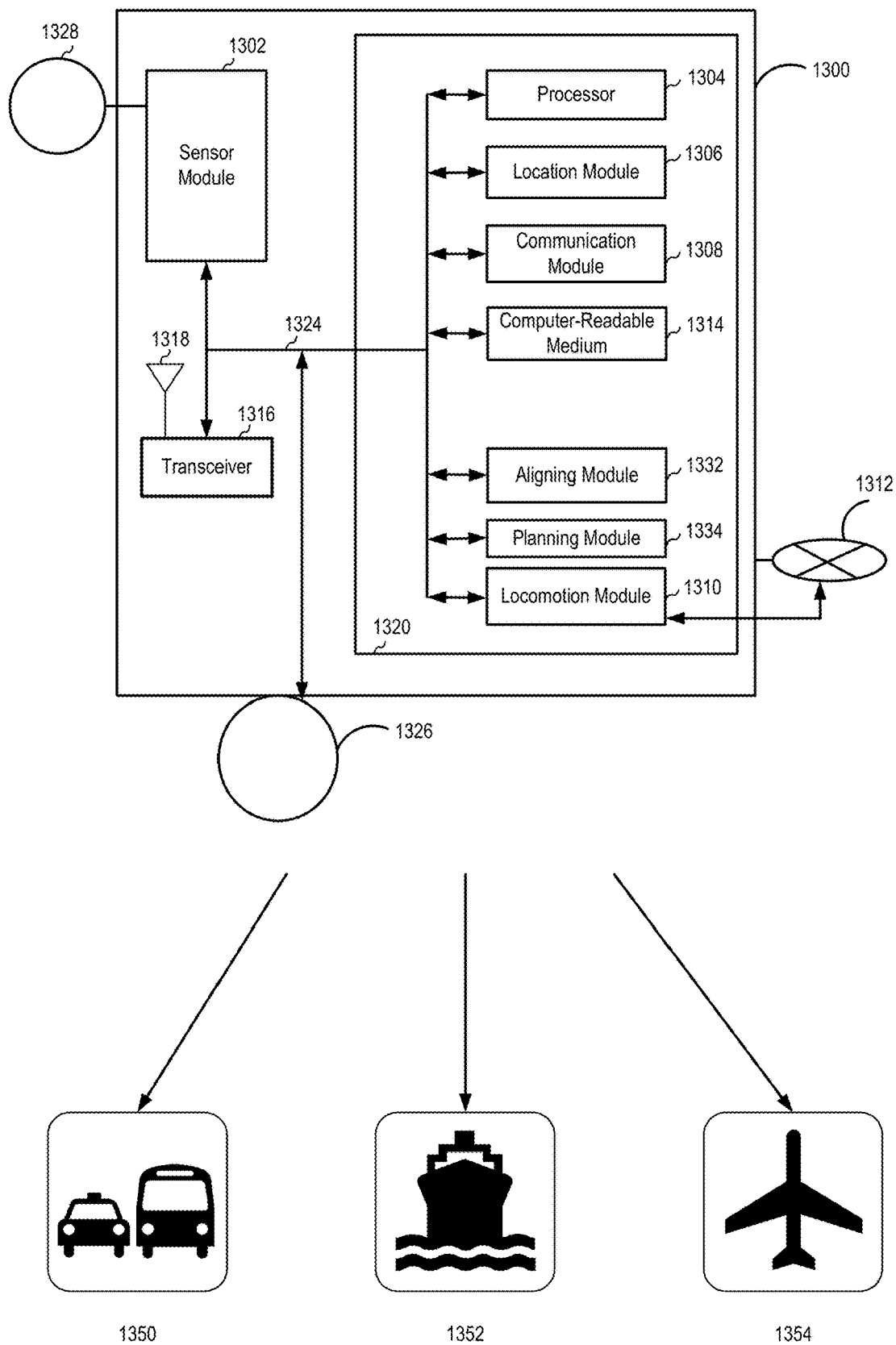
FIG. 13 is a block diagram illustrating different modules/means/components in an exemplary apparatus for aligning a 3D model to an object of interest in a 2D image.

FIG. 13 is a diagram illustrating an example of a hardware implementation for an apparatus 1300, such as a vehicle (e.g., robotic vehicle), employing a processing system 1320. The apparatus 1300 may be a component of a vehicle. For example, as shown in FIG. 13, the apparatus 1300 may be a component of a vehicle, such as a car/bus 1350, boat 1352, airplane/drone 1354, or robot (not shown).

The apparatus 1300 may be implemented with a bus architecture, represented generally by the bus 1324. The bus 1324 may include any number of interconnecting buses and bridges depending on the specific application of the apparatus 1300 and the overall design constraints. The bus 1324 links together various circuits including one or more processors and/or hardware modules, represented by the processor 1304 the communication module 1308, location module 1306, sensor module 1302, locomotion module 1310, and the computer-readable medium 1314. The bus 1324 may also link various other circuits such as timing sources, peripherals, voltage regulators, and power management circuits, which are well known in the art, and therefore, will not be described any further.

The apparatus 1300 includes a processing system 1320 coupled to a transceiver 1316. The transceiver 1316 is coupled to one or more antennas 1318. The transceiver 1316 enables communicating with various other apparatus over a transmission medium. For example, the transceiver 1316 may receive commands via transmissions from a user or a remote device. The processing system 1320 includes a processor 1304 coupled to a computer-readable medium 1314. The processor 1304 is responsible for general processing, including the execution of software stored on the computer-readable medium 1314. The software, when executed by the processor 1304, causes the processing system 1320 to perform the various functions described for any particular apparatus. The computer-readable medium 1314 may also be used for storing data that is manipulated by the processor 1304 when executing software.

The sensor module 1302 may be used to obtain measurements via a first sensor 1328 and a second sensor 1326. The first sensor 1328 may be a stereo-vision sensor, such as a stereoscopic camera, for capturing 2D images and/or detecting objects in the 2D image. The second sensor 1326 may be a camera and/or an inertial measurement unit. Of course, aspects of the present disclosure are not limited to a stereo-vision sensor as other types of sensors, such as, for example, radar, thermal, sonar, and/or lasers are also contemplated for capturing 2D images and/or detecting objects in the 2D image. The measurements of the first sensor 1328 and the second sensor 1326 may be processed by one or more of the processor 1304 the communication module 1308, location module 1306, locomotion module 1310, the computer-readable medium 1314, and other modules 1332, 1334. As previously discussed, the measurements from the first sensor 1328 may be used to capture 2D images. Furthermore, the measurements from the second sensor 1326 may be used for localization. For example, the measurements from the second sensor 1326 may be used by to location module 1306 to determine a location of the apparatus 1300. Furthermore, the measurements of the first sensor 1328 and the second sensor 1326 may be transmitted to an external device by the transceiver 1316. The first sensor 1328 and the second sensor 1326 are not limited to being defined external to the apparatus 1300, as shown in FIG. 13, the first sensor 1328 and the second sensor 1326 may also be defined within the apparatus 1300.

The location module 1306 may be used to determine a location of the apparatus 1300. The communication module 1308 may use the transceiver 1316 to send and receive information, such as the location of the apparatus 1300, to an external device. The locomotion module 1310 may be used to provide locomotion to the apparatus 1300. As an example, locomotion may be provided via rotary blades 1312. Of course, aspects of the present disclosure are not limited to providing locomotion via rotary blades 1312 and are contemplated for any other type of component for providing locomotion, such as propellers, wheels, treads, fins, and/or jet engines.

The processing system 1320 includes an alignment module 1332 for aligning a 3D model to an object in the 2D image. Specifically, the alignment module 1332 may be configured to detect the object from the 2D image with an object detector, estimate a geodesic distance value between the object and rendered 3D images corresponding to multiple discretized poses of the 3D model, select a rendered 3D image corresponding to a smallest geodesic distance value, and propagate pose parameters of the selected rendered 3D image to the object.

The processing system 1320 also includes a planning module 1334 for planning a motion based at least in part on the 3D model analysis performed based on the alignment of the 3D model to the object map, the localization information, and/or a user input. In one configuration, the planning module 1334 overrides the user input when the user input is expected (e.g., predicted) to cause a collision. The modules may be software modules running in the processor 1304, resident/stored in the computer-readable medium 1314, one or more hardware modules coupled to the processor 1304, or some combination thereof.

In one configuration, geometric differential module is configured for aligning a 3D model to an object in a 2D image. In this configuration, the object is detected from the 2D image with an object detector. The model also estimates a geodesic distance value between the object and multiple discretized poses of the 3D model. The model further selects a discretized pose of the multiple discretized poses corresponding to a smallest geodesic distance value. The model also propagates pose parameters of the selected discretized pose of the 3D model to the object. In one configuration, the model includes detecting means, estimating means selecting means, and/or propagating means. In one aspect, the detecting means, estimating means selecting means, and/or propagating means may be the general-purpose processor 102, program memory associated with the general-purpose processor 102, memory block 118, local processing units 202, alignment module 1332, and/or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, the method 1200 may be performed by the SOC 100 (FIG. 1), the system 200 (FIG. 2), the apparatus 1300. That is, each of the elements of the method 1200 may, for example, but without limitation, be performed by the SOC 100, the system 200, the apparatus 1300, one or more processors (e.g., CPU 102 and local processing unit 202), the alignment module 1332, and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method, comprising:
   detecting, with an object detector, an object from a two-dimensional (2D) image;
   estimating a geodesic distance value between the object from the 2D image and a plurality of discretized poses of a three-dimensional (3D) model of the object;
   selecting a discretized pose from the plurality of discretized poses of the 3D model corresponding to a smallest geodesic distance value of the estimated geodesic distance values between the object from the 2D image and the plurality of discretized poses of the 3D model, such that the selected discretized pose of the 3D model aligns with the object in the 2D image; and
   propagating pose parameters of the selected discretized pose of the 3D model to the object.

2. The method of claim 1, further comprising:
   performing 3D model analysis of the object based on the propagated pose parameters; and
   controlling movement of a device based on the 3D model analysis.

3. The method of claim 2, in which the 3D model analysis determines at least one of an orientation of the object, a distance of the object relative to the device, a movement direction of the object, or a combination thereof.

4. The method of claim 1, in which estimating the geodesic distance value comprises:
   determining a first feature map based on an appearance of the object;
   determining a second feature map based on an appearance of the 3D model; and
   estimating the geodesic distance value based on the first feature map and the second feature map.

5. The method of claim 1, in which the 3D model is textureless and the object is textured.

6. The method of claim 1, in which the pose parameters comprise at least one of an azimuth, an elevation, an in-plane rotation, a camera distance, a principle offset, a focal length, a viewport, or a combination thereof.

7. An apparatus, comprising:
   a memory; and
   at least one processor coupled to the memory, the at least one processor configured:
      to detect, with an object detector, an object from a two-dimensional (2D) image;
      to estimate a geodesic distance value between the object from the 2D image and a plurality of discretized poses of a three-dimensional (3D) model of the object;
      to select a discretized pose from the plurality of discretized poses of the 3D model corresponding to a smallest geodesic distance value of the estimated geodesic distance values between the object from the 2D image and the plurality of discretized poses of the 3D model, such that the selected discretized pose of the 3D model aligns with the object in the 2D image; and
      to propagate pose parameters of the selected discretized pose of the 3D model to the object.

8. The apparatus of claim 7, in which the at least one processor is further configured:
   to perform 3D model analysis of the object based on the propagated pose parameters; and
   to control movement of a device based on the 3D model analysis.

9. The apparatus of claim 8, in which the 3D model analysis determines at least one of an orientation of the object, a distance of the object relative to the device, a movement direction of the object, or a combination thereof.

10. The apparatus of claim 7, in which the at least one processor is further configured to estimate the geodesic distance value by:
    determining a first feature map based on an appearance of the object;
    determining a second feature map based on an appearance of the 3D model; and
    estimating the geodesic distance value based on the first feature map and the second feature map.

11. The apparatus of claim 7, in which the 3D model is textureless and the object is textured.

12. The apparatus of claim 7, in which the pose parameters comprise at least one of an azimuth, an elevation, an in-plane rotation, a camera distance, a principle offset, a focal length, a viewport, or a combination thereof.

13. A non-transitory computer-readable medium having program code recorded thereon, the program code executed by a processor and comprising:
    program code to detect, with an object detector, an object from a two-dimensional (2D) image;
    program code to estimate a geodesic distance value between the object from the 2D image and a plurality of discretized poses of a three-dimensional (3D) model of the object;
    program code to select a discretized pose from the plurality of discretized poses of the 3D model corresponding to a smallest geodesic distance value of the estimated geodesic distance values between the object from the 2D image and the plurality of discretized poses of the 3D model, such that the selected discretized pose of the 3D model aligns with the object in the 2D image; and program code to propagate pose parameters of the selected discretized pose of the 3D model to the object.

14. The non-transitory computer-readable medium of claim 13, in which the program code further comprises:

program code to perform 3D model analysis of the object based on the propagated pose parameters; and program code to control movement of a device based on the 3D model analysis.

15. The non-transitory computer-readable medium of claim 14, in which the program code to perform 3D model analysis determines at least one of an orientation of the object, a distance of the object relative to the device, a movement direction of the object, or a combination thereof.

16. The non-transitory computer-readable medium of claim 13, in which the program code to estimate the geodesic distance value further comprises:

program code to determine a first feature map based on an appearance of the object;

program code to determine a second feature map based on an appearance of the 3D model; and program code to estimate the geodesic distance value based on the first feature map and the second feature map.

17. The non-transitory computer-readable medium of claim 13, in which the 3D model is textureless and the object is textured.

18. The non-transitory computer-readable medium of claim 13, in which the pose parameters comprise at least one of an azimuth, an elevation, an in-plane rotation, a camera distance, a principle offset, a focal length, a viewport, or a combination thereof.

19. An apparatus, comprising:

means for detecting an object from a two-dimensional (2D) image;

means for estimating a geodesic distance value between the object from the 2D image and a plurality of discretized poses of a three-dimensional (3D) model of the object;

means for selecting a discretized pose from the plurality of discretized poses of the 3D model corresponding to a smallest geodesic distance value of the estimated geodesic distance values between the object from the 2D image and the plurality of discretized poses of the 3D model, such that the selected discretized pose of the 3D model aligns with the object in the 2D image; and means for propagating pose parameters of the selected discretized pose of the 3D model to the object.

20. The apparatus of claim 19, further comprising:

means for performing 3D model analysis of the object based on the propagated pose parameters; and means for controlling movement of a device based on the 3D model analysis.

21. The apparatus of claim 20, in which the means for performing 3D model analysis comprises means for determining at least one of an orientation of the object, a distance of the object relative to the device, a movement direction of the object, or a combination thereof.

22. The apparatus of claim 19, in which the means for performing estimating the geodesic distance value comprises:

means for determining a first feature map based on an appearance of the object;

means for determining a second feature map based on an appearance of the 3D model; and means for estimating the geodesic distance value based on the first feature map and the second feature map.

23. The apparatus of claim 19, in which the 3D model is textureless and the object is textured.

24. The apparatus of claim 19, in which the pose parameters comprise at least one of an azimuth, an elevation, an in-plane rotation, a camera distance, a principle offset, a focal length, a viewport, or a combination thereof.

* * * * *